(12) United States Patent
Reede et al.

(10) Patent No.: US 8,711,038 B2
(45) Date of Patent: Apr. 29, 2014

(54) HIGH-RESOLUTION RANGING AND LOCATION FINDING USING MULTICARRIER SIGNALS

(75) Inventors: Ivan Reede, Montreal (CA); Gerald Chouinard, Gatineau (CA)

(73) Assignee: Her Majesty the Queen in Right of Canada as represented by the Minister of Industry, through the Communications Research Centre Canada, Ottawa, Ontario (CA)

( * ) Notice: Subject to any disclaimer, the term of this patent is extended or adjusted under 35 U.S.C. 154(b) by 449 days.

(21) Appl. No.: 13/020,067

(22) Filed: Feb. 3, 2011

(65) Prior Publication Data

US 2012/0032855 A1    Feb. 9, 2012

Related U.S. Application Data

(63) Continuation-in-part of application No. 11/868,190, filed on Oct. 5, 2007, now abandoned.

(60) Provisional application No. 61/312,687, filed on Mar. 11, 2010, provisional application No. 60/828,326, filed on Oct. 5, 2006.

(51) Int. Cl.
*G01S 13/84* (2006.01)

(52) U.S. Cl.
USPC .......................................... 342/458; 342/463

(58) Field of Classification Search
USPC ........................... 342/458, 463; 375/354–355
IPC . G01S 5/14,13/82, 13/825, 13/84; H04W 64/00
See application file for complete search history.

(56) References Cited

U.S. PATENT DOCUMENTS

| 5,510,801 | A | | 4/1996 | Engelbrecht et al. .......... 342/457 |
| 5,732,113 | A | * | 3/1998 | Schmidl et al. ............... 375/355 |
| 5,835,541 | A | * | 11/1998 | Namekata et al. ............. 375/355 |
| 7,030,761 | B2 | | 4/2006 | Bridgelall et al. ......... 340/572.2 |
| 7,072,289 | B1 | | 7/2006 | Yang et al. ..................... 370/208 |
| 7,126,536 | B2 | | 10/2006 | Rabinowitz et al. .......... 342/464 |
| 7,489,731 | B2 | | 2/2009 | Coulson et al. ............... 375/260 |
| 7,710,321 | B2 | | 5/2010 | Heidari-Bateni et al. .... 342/458 |
| 7,792,202 | B2 | | 9/2010 | Kim ............................... 375/260 |

(Continued)

OTHER PUBLICATIONS

Nyquist sampling rate. (1999). In Focal Dictionary of Telecommunications, Focal Press. Retrieved from http://www.credoreference.com/entry/bhfidt/nyquist_sampling_rate.*

(Continued)

*Primary Examiner* — Jack W Keith
*Assistant Examiner* — Fred H Mull
(74) *Attorney, Agent, or Firm* — Teitelbaum & MacLean; Neil Teitelbaum; Doug MacLean

(57) ABSTRACT

The invention relates to methods and systems for accurate ranging and geo-locationing using coherent multicarrier (CM) signals and based on a high-resolution estimation of a receiver timing offset in a signal receiver that receives ranging CM signals. A transmitter transmits a ranging CM signal having a known subcarrier modulation pattern. The receiver samples the ranging CM signal it receives reflected back from an object or from the remote transmitter, and processes the sampled signal that preserves relative subcarrier phases using a high-resolution model channel response function to determine the receiver timing offset with resolution much better than the receiver sampling period. The receiver timing offset is used to determine a flight time for the ranging CM signal with high accuracy.

20 Claims, 17 Drawing Sheets

(56) References Cited

U.S. PATENT DOCUMENTS

| | | | |
|---|---|---|---|
| 7,809,097 B2 | 10/2010 | Wang et al. | 375/355 |
| 7,813,454 B2 | 10/2010 | Cahn et al. | 375/340 |
| 7,860,014 B2 | 12/2010 | Takano | 370/241 |
| 2005/0206555 A1 | 9/2005 | Bridgelall et al. | 342/127 |
| 2007/0053473 A1* | 3/2007 | Palin | 375/355 |
| 2007/0200759 A1* | 8/2007 | Heidari-Bateni et al. | 342/387 |
| 2009/0010361 A1 | 1/2009 | Yang | 375/316 |
| 2010/0239053 A1 | 9/2010 | Cahn et al. | 375/342 |
| 2010/0260294 A1 | 10/2010 | Zhengang et al. | 375/343 |
| 2011/0026577 A1* | 2/2011 | Primo et al. | 375/232 |
| 2011/0051862 A1 | 3/2011 | Li et al. | 375/343 |

OTHER PUBLICATIONS

Symbol Time Offset Estimation in Coherent OFDM Systems, Daniel Landström, Sarah Kate Wilson, Jan-Jaap van de Beek, Per Ödling, and Per Ola Börjesson, IEEE Transactions on Communications, vol. 50, No. 4, Apr. 2002, p. 545.

ML estimation of time and frequency offset in OFDM systems, van de Beek, J.J.; Sandell, M.; Borjesson, P.O.; Div. of Signal Processing, Lulea Univ. of Technol. IEEE Transactions on Signal Processing, vol. 45 Issue:7 , pp. 1800-1805, ISSN: 1053-578X, Jul. 1997.

\* cited by examiner

HIGH-RESOLUTION RANGING AND LOCATION FINDING USING MULTICARRIER SIGNALS

CROSS-REFERENCE TO RELATED APPLICATIONS

The present invention claims priority from U.S. Provisional Patent Application No. 61/312,687 filed Mar. 11, 2010, which is incorporated herein by reference for all purposes. It is also a continuation-in-part of a U.S. patent application Ser. No. 11/868,190, entitled "System and Method to Range Using Multi-Carrier Phasing Synchronization", filed Oct. 5, 2007 now abandoned, which claims priority from U.S. Provisional Patent Application No. 60/828,326 filed Oct. 5, 2006, all of which are incorporated herein by reference for all purposes.

TECHNICAL FIELD

The present invention generally relates to systems and devices that can use coherent multicarrier signals, and more particularly relates to methods and systems for receiver timing offset estimation, ranging and location finding using coherent multicarrier signals.

BACKGROUND OF THE INVENTION

Many wireless communication systems may benefit from, or even require, knowledge of geographical location of particular wireless devices. For example, knowledge of user terminal location may be required in some wireless systems such as cellphone networks, cognitive radio systems, etc. One known approach is to use Global Positioning System (GPS) signals for this purpose. Drawbacks of this approach include the need to incorporate a GPS receiver in wireless devices, potential problems with the reception of GPS signals indoors and in the vicinity of tall buildings or in mountainous regions where signal blockage and multipath interference would occur.

Another approach is to utilize wireless signals to carry out terrestrial ranging, that is calculate the distances between the device transmitting a specific RF signal and the device receiving this RF signal. A particular application is when this RF signal is generated by wireless communication devices and integrated as part of their transmission to determine distances between the devices. Once distances between a target device and two or more reference devices of known locations in the network are determined, the geographical location of the target device can be computed using known triangulation techniques.

The process of determining the distance from a reference wireless device to a target wireless device, is conventionally referred to as range measurements, or ranging. By sending wireless signals from a reference wireless device to a target wireless device and/or vice versa and analyzing timing information comprised in the received signals, time-of-flight information between the two devices can sometimes be estimated. This estimated time of flight may then be used to compute the distance between the reference and target wireless devices. See for example U.S. Pat. No. 5,510,801 to Engelbrecht et al, U.S. Pat. No. 7,126,536 to Rabinowitz et al., U.S. Pat. No. 7,710,321 to Heidari-Bateni et al., and U.S. Patent Application 2009/0010361 to Yang, which are incorporated herein by reference.

One difficulty in using the time-of-flight approach in wireless digital communication systems is the limited accuracy of a receiver timing offset, also referred to in the art as the receiver clock offset, relative to the transmitted signal clock. In a typical receiver, the received signal is sampled, at RF, IF or baseband, by a local clock signal (Rx-clock) typically generated within the receiver. At the transmitter, the signal is created using its own local clock signal (Tx-clock), typically generated within the transmitter. Although Tx-clock and Rx-clock may be suitably well synchronized in frequency, they are typically not synchronized in time with sufficient accuracy. The inaccuracy in time synchronization is hereafter referred to as "Rx timing offset". One known solution is to use an external reference clock, for example from a GPS, see e.g. U.S. Pat. No. 5,510,801. However, an external reference clock may not always be available or practical. Although methods of estimating the receiver timing offset in the absence of a reference clock are known in the art, such as by correlating a section of the received signal having a known modulation pattern with a copy of the modulation pattern saved at the receiver, these methods often have limited accuracy. In particular, most known methods of estimating the receiver timing offset are limited in accuracy by a sampling time period $T_s$ used in digitizing the received signal, so that the timing offset estimation accuracy is on the order of $\pm T_s/2$, which may not be enough to provide a required ranging accuracy. For example, for a 6 MHz bandwidth signal that may be represented at baseband by a −3 MHz to +3 MHz signal and sampled in the complex plane, the Nyquist sampling frequency is 6 MHz which results in a sampling period of 166 ns, which, in free space and for an electromagnetic signal, corresponds to a propagation distance of 50 m. Once triangulation calculations have taken place, the accuracy achievable will be in the +/−100 m range. To circumvent this limitation, U.S. Pat. No. 7,710,321 discloses a method for estimating the range between two devices wherein the receiver performs multiple samplings of a same received signal with different offsets in the sampling clock phase. This approach effectively increases an effective sampling frequency, providing the receiver with additional information enabling to increase the timing offset accuracy beyond the sampling period. One disadvantage of this method, however, is the large number of additional measurements that the receiver has to perform in this method, with the proportionally increased computation requirements, so that the method does not scale well if the required increase in the timing offset accuracy is, for example, 10-fold or 100-fold.

Accordingly, an object of the present invention is to provide a method and apparatus for determining a receiver timing offset with an accuracy better than the receiver sampling period, without requiring considerable changes to the receiver sampling process, and which could be used in ranging, geo-locationing and radar-type applications for accurate determination of distances and locations using multicarrier signals.

SUMMARY OF THE INVENTION

Accordingly, one aspect of the present invention relates to a method for determining a receiver timing offset, which comprises the steps of: a) receiving a coherent multicarrier (CM) signal by a receiver, the CM signal comprising a plurality of frequency multiplexed subcarriers characterized by subcarrier phases and subcarrier amplitudes and generated by a CM transmitter using a known subcarrier modulation pattern or a known absence of subcarrier modulation; b) transforming the CM signal at the receiver into a sampled signal preserving relative subcarrier phase information, wherein the sampled signal has a sample rate R satisfying a Nyquist criterion R>2F, wherein F is a modulation bandwidth of the CM signal; and, c) processing the sampled signal using a time step dt that is at least 2 times smaller than a sample time period $T_s$ of the sampled signal to obtain the receiver timing offset.

Step (c) of the method may further comprise: computing a discrete complex channel impulse response (CCIR) from the sampled signal, processing the discrete CCIR to obtain a high-resolution discrete channel function defined on a high-resolution time grid spaced by the time step dt, and identifying a peak location in the high-resolution channel function to determine the timing offset in the receiver. In one aspect of the invention, the discrete CCIR is processed by correlating it with a high-resolution model function defined on the high-resolution time grid, wherein the high-resolution model function represents a pre-determined model CCIR.

One aspect of the present invention provides a method for determining a distance to an object from a first communication device comprising a first coherent multicarrier (CM) transmitter and a first receiver; the method comprises the following steps: i) directing the first CM transmitter to transmit a first ranging CM signal for impinging upon an object, and recording a first transmission start time indicative of a time instance when the first ranging CM signal leaves the first CM transmitter, and ii) upon receiving by the first receiver a return CM signal from the object, performing the steps of: determining a first timing offset $\delta t_1$ in the first receiver, recording a first sampling start time, or a first coarse time of arrival, for the return CM signal at the first receiver, and, determining the distance between the object and the first communication device based on at least the first transmission start time, the first sampling start time, and the first timing offset at the first receiver. The return CM signal may be the first CM signal reflected by the object, or the object may be a second communication device comprising a second receiver and a second CM transmitter for transmitting a second ranging CM signal that forms the return CM signal. In the latter case, the method further includes: recording at the second communication device a second coarse time of arrival of the first ranging CM signal, generating the return CM signal by the second communication device using a subcarrier modulation pattern that is known to the first receiver, transmitting the return CM signal by the second CM transmitter for reception at the first communication device, and recording a transmission start time at which the return CM signal leaves the second transmitter.

Another aspect of the present invention relates to an apparatus comprising: receiver front-end circuitry for transforming a received signal into a sampled signal having a sample rate R satisfying the Nyquist criterion; a channel estimator for generating a discrete complex channel impulse response (CCIR) function from the sampled signal when the received signal comprises a plurality of coherently multiplexed subcarriers, wherein the channel estimator uses a known subcarrier modulation pattern, or a known absence of the subcarrier modulation for generating the CCIR function; a correlator coupled to the channel estimator for correlating the discrete CCIR and a higher-resolution model function defined on a high-resolution time grid spaced at a time interval that is at least two times smaller than a sample time period of the sampled signal, and for outputting a high-resolution channel function defined on the high-resolution time grid; and a peak processor for identifying a peak location in the high-resolution channel function for determining a timing offset in the receiver with a time resolution of a fraction of the sample time period.

Another feature of the present invention provides an apparatus for determining a distance between a first CM transceiver comprising a first receiver and a first CM transmitter, and a second CM transceiver comprising a second receiver and a second CM transmitter, the apparatus comprising: an input port for receiving information signals comprising information defining first and second discrete complex channel impulse responses (CCIRs) from the first and second receivers, and for receiving coarse timing information from at least one of the first and second CM transceivers; a model function memory for storing at least one higher-resolution model function defined at time intervals that are at least 2 times smaller than the sampling time interval Ts used for determining the first and second discrete CCIRs at the first and second receivers, respectively; and, a flight time processor comprising a CCIR processor for processing the first and second discrete CCIRs using at least one discrete high-resolution prototype function to obtain first and second high-resolution channel functions, a peak locator for identifying peak locations in the first and second high-resolution channel functions to determine first and second timing offsets in the first and second receivers with a time resolution of a fraction of the sampling time interval, and a flight time computer for determining a flight time between the first and second communication devices based on at least the coarse timing information, and the first and second timing offsets at the first and second receivers.

An aspect of the present invention provides a method of ranging between two wireless transceivers, each wireless transceiver comprising a coherent multicarrier (CM) transmitter and a receiver, comprising: directing the transceivers to exchange ranging CM signals, while recording at each of the transceivers a transmission start time for the ranging CM signal generated at the respective transmitter, and a sampling start time for the ranging CM signal received at the respective receiver; applying the method of claim 1 to the ranging CM signals received at each of the two transceivers to determine receiver timing offset values therefor; and, determining a time-of-flight value for CM signal propagation between the two transceivers based on the transmission start times, the sampling start times, and the receiver timing offset values.

One aspect of the present invention provides a method to determine a location of a third wireless transceiver in a system comprising a first wireless transceiver comprising a first CM transmitter and a first receiver at a first known location, a second wireless transceiver comprising a second CM transmitter and a second receiver at a second known location, and the third wireless transceiver comprising a third CM transmitter and a third receiver. The method comprises:

a) directing the first transmitter to transmit a first ranging CM signal at a first reference time instant $Tref_1$ for reception by the second and third transceivers, and directing the second and third transmitters to transmit second and third ranging signals, respectively, for reception at the first transceiver, and using the first, second and third ranging CM signals for ranging between the first transceiver and the second transceiver, and between the first transceiver and the third transceiver, for:
i) determining a first time-of-flight value $ToF_{12}$ between the first transceiver and the second transceiver, and a second timing offset $\delta t_2$ for the first ranging signal received at the second receiver, and ii) determining a second time-of-flight value $ToF_{13}$ between the first transceiver and the third transceiver, and a third timing offset $\delta t_3$ for the first ranging signal received at the third receiver;

b) determining a second reference time instant $Tref_2$ at the second transceiver relative to the first reference time instant $Tref_1$ at the first transceiver according to an equation $Tref_2 = Tref_1 + ToF_{12} - \delta t_2$;

c) determining a third reference time instant $Tref_3$ at the third transceiver relative to the first reference time instant $Tref_1$ at the first transceiver according to an equation $Tref_3 = Tref_1 + ToF_{13} - \delta t_3$;

d) directing the second transceiver to transmit a forth ranging CM signal at a first time delay $Tdelay_2$ after the second reference time instance $Tref_2$;

e) directing the third transceiver to receive the forth ranging CM signal at a second time delay $Tdelay_3$ after the third reference time instance $Tref_3$;

f) determining a fourth timing offset $\delta t_4$ for the fourth ranging signal received at the third receiver;

g) computing a third time-of-flight value $ToF_{23}$ between the second transceiver and the third transceiver according to an equation $$ToF_{23} = (Tref_3 + Tdelay_3) - (Tref_2 + Tdelay_2) - \delta t_4$$
$$= (ToF_{13} - ToF_{12}) - (\delta t_3 - \delta t_2) + (Tdelay_3 - Tdelay_2) + \delta t_4; \text{ and,}$$

h) determining the location of the third transceiver based on the time of flight values $ToF_{13}$, $ToF_{12}$, $ToF_{23}$, and the known location of the first and second transceivers using triangulation.

BRIEF DESCRIPTION OF THE DRAWINGS

The invention will be described in greater detail with reference to the accompanying drawings which represent preferred embodiments thereof, in which like elements are indicated with like reference numerals, and wherein:

FIG. 1B is a diagram illustrating two transceivers exchanging CM signals for measuring a distance there between;

DETAILED DESCRIPTION

Figure 1A:
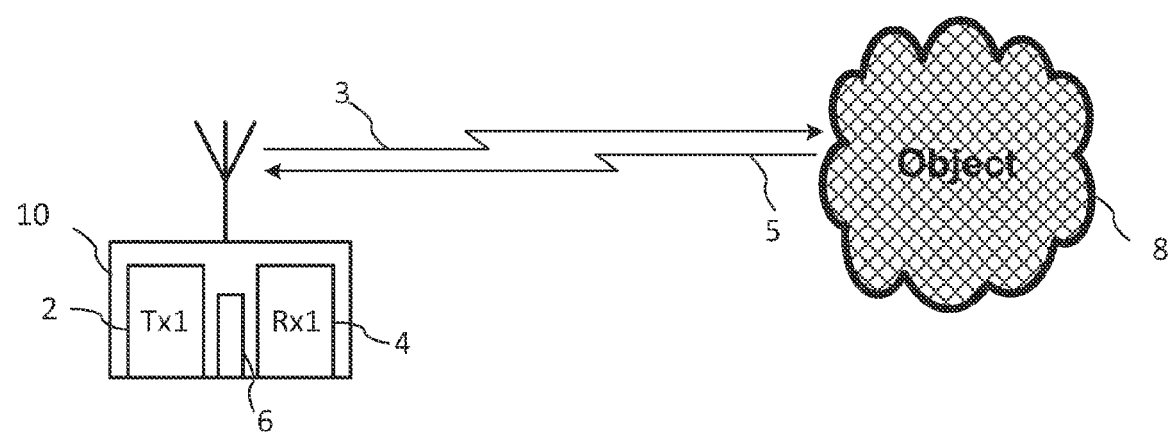
FIG. 1A is a diagram illustrating measuring a distance to an object from a transceiver emitting a CM signal.

In the following description, reference is made to the accompanying drawings which form a part thereof and which illustrate several embodiments of the present invention. It is understood that other embodiments may be utilized and structural and operational changes may be made without departing from the scope of the present invention. The drawings include flowcharts and block diagrams. The functions of the various elements shown in the drawings may be provided through the use of analog RF circuitry and data processing hardware such as but not limited to dedicated logical circuits within a data processing device, as well as data processing hardware capable of executing software in association with appropriate software. When provided by a processor, the functions may be provided by a single dedicated processor, by a single shared processor, or by a plurality of individual processors, some of which may be shared. The term "processor" should not be construed to refer exclusively to hardware capable of executing software, and may implicitly include without limitation, logical hardware circuits dedicated for performing specified functions, digital signal processor ("DSP") hardware, application specific integrated circuits (ASICs), field-programmable gate arrays (FPGAs), read-only memory ("ROM") for storing software, random access memory ("RAM"), and non-volatile storage. The term "processor' is also used herein to refer to a functional module defined within a hardware processor.

The term "coherent multicarrier signal", or "CM signal" is used herein to mean a signal that is built from a plurality of subcarriers for which the phase and amplitude relationship amongst these subcarriers is known when the signal, which has been converted to the time domain by, for example, an IDFT of a known length, leaves the transmitter. When this CM signal arrives at the receiver and is converted to the frequency domain by, for example, a DFT, a new phase and amplitude relationship amongst these subcarriers may exist due to various transmission channel aberrations such as multipath propagation as well as the receiver reference sampling time, i.e., the time of the first sample of the time window used to convert this received signal to the frequency domain to recover the plurality of subcarriers at the receiver.

The term 'discrete signal', as used in this specification, may mean a 'sampled signal' i.e., a sequence of discrete signal values representing an analog signal at a series of time instances, also referred to as sampling times. The term 'discrete signal' may also mean a digital signal in the form of a sequence of discrete values. The discrete signal values can be real values or complex values. They may be of integer or of floating point format. In the case of a complex signal representation, the signal values may be formed of two real values representing the amplitude and phase of the signal at the sampling times, or the in-phase (I) and quadrature (Q) values as known in the art. Those skilled in the art will appreciate that the terms "complex signal" and "complex value" are terms used for convenience of description and do not imply the use of complex arithmetics in practical implementations.

The terms "receiver timing offset" and 'timing offset" are used in this specification interchangeably to mean a time offset between a transmitter reference sampling time, i.e., the time of the first sample of the time window containing the discrete signal values resulting from the conversion of the plurality of subcarriers from the frequency domain to the time domain, as it arrives at the receiver, and the receiver reference sampling time, i.e., the time of the first sample of the time window used to convert this received signal in the frequency domain to recover the plurality of subcarriers at the receiver. For OFDM signals, it means an offset, in the signal timeframe, between the first sample of the time window resulting from the IDFT at the transmitter used to form an OFDM symbol and the time of the first sample of the DFT window used at the receiver to process the received OFDM symbol. A timing offset equal to zero would mean that the first sample of the reconstituted OFDM symbol at the receiver would correspond precisely to the first sample used to generate this signal at the transmitter, resulting in a perfect time synchronization of the sampling processes at the transmitter and receiver relative to the transmitted signal. The notations DFT(X) and IDFT(X) denote a digital Fourier transform (DFT) operation on a vector X and a corresponding inverse operation, respectively, with FFT(X) and IFFT(X) denoting the fast Fourier transform (FFT) and its inverse operation (IFFT), respectively. The notation of the form X(n) denotes an n-th element of a vector X, with 'n' representing a time sample or a frequency sample. The term "vector" is used herein to refer to a sequence of signal samples of a finite length, or a sequence of values generated by processing a sequence of signal samples, or any other ordered set of values.

In addition, the following is a partial list of abbreviated terms and their definitions used in the specification:
ASIC Application Specific Integrated Circuit
DSP Digital Signal Processor
FPGA Field Programmable Gate Array
ISI Inter-symbol Interference
PN Pseudo Noise or Pseudo Random
RF Radio Frequency
CIR Channel Impulse Response Exemplary embodiments of the current invention will now be described with references to diagrams including those shown in FIGS. 1A-1D, 2, 4, 6, and 10-13, wherein each block represents a functional unit adopted to perform one or several steps of the method of the present invention; these steps will be also hereinafter described with reference to method charts in FIGS. 5, and 14-16. The various functional units shown as blocks in FIGS. 2, 4, 6, and 10-13 can be integrated or separate structures implemented in either software or hardware or a combination thereof commonly known to provide functionalities described hereinbelow with reference to respective blocks, including DSPs, ASICs, FPGAs, and analogue RF circuitry.

FIGS. 1A to 1E schematically illustrate several exemplary scenarios in which embodiments of the present invention can be utilized. Referring first to FIG. 1A, there is shown a communication device 10, such as a wireless transceiver, which utilizes a CM signal to determine the distance to an object 8. The communication device 10 is also referred to hereinafter as the first communication device, or the first transceiver. In one embodiment, the communication device 10 includes a CM transmitter 2 and a receiver 4, which are labeled in FIGS. 1A to 1D as 'Tx1' and 'Rx1', respectively. Abbreviations "Tx" and Rx" will be used in the present specification to generally refer to a transmitter and a receiver, respectively.

When used with electromagnetic waves, an antenna may be used as a transducer from waves propagating on a transmission line to waves propagating in space and vice-versa. Within a same transceiver, Rx and Tx may use a common or independent antennas, or in other embodiments the Rx and Tx may use other appropriate transducers or no transducer at all. For the purposes of these example embodiments, these transducers, when present, are considered part of the Tx and Rx.

In operation, the first transceiver 10 generates a ranging CM signal 3, which is also referred to hereinafter as the first ranging CM signal, from a plurality of M>1 of CM subcarriers with subcarrier frequencies $f_i$, i=1, . . . , M, and emits it towards an object 8 for impinging thereupon, recording a time instance $T_{t1}$ at which the front end of the ranging signal leaves the transceiver 10. The time instance $T_{t1}$ is also referred to hereinafter as the first transmission start time. Upon receiving a return CM signal 5 from the object 8, the transceiver 10 transforms it into a sampled CM signal $Y_1$ so as to preserve relative subcarrier phase information contained in the received signal. The first transceiver 10 also records a start time $T_{r1}$ of the sampling of the return signal 5' relative to a local sampling clock; $T_{r1}$ corresponds to a first sampling point in the sampled CM signal $Y_1$ and is also referred to herein as the first sampling start time. Since in this exemplary embodiment the transmitter 2 and the receiver 4 are contained in the same transceiver 10, the CM signal generation and the received CM signal recovery may be synchronized to a same sampling clock frequency having a time period of $T_s$. The first transmission start time $T_{t1}$ of the ranging CM signal 3 and the first sampling start time $T_{r1}$ of the return CM signal may therefore be expressed relative to the same time frame reference since they are co-located. Both $T_{t1}$ and $T_{r1}$ can be defined with a granularity of the sampling time period $T_s$ used at the transceiver 10. $T_{r1}$ indicates an approximate time of arrival (ToA) of the return signal 5 at the transceiver 10, and is therefore also referred to herein as the coarse ToA estimate at the first transceiver.

According to an aspect of the present invention, the sampled CM signal $Y_1$ obtained at the first transceiver 10 is used to compute a first receiver sampling offset $\delta t_1$, also referred to herein as the receiver timing offset, with a time resolution of a fraction of the sampling period $T_s$, on the basis of known information about subcarrier modulation of the return signal. This sampling offset $\delta t_1$ can then be used as a ToA correction value to determine a corrected ToA, which will be denoted herein as $T_{oA1}$, with a resolution down to a small fraction of the sampling period $T_s$, $T_{oA1}=T_{r1}+\delta t_1$. In one embodiment, the act of recording the transmission start time $T_{t1}$ may be in the form of initiating a local clock counter, which is then stopped at the start of the sampling of the return signal 5; in this embodiment, $T_{t1}=0$, and $T_{r1}$ is the number of periods $T_s$ of the local sampling clock between the time when the first ranging CM signal 3 leaves the transceiver 10, and the start time for the sampling of the return CM signal 5 at the receiver 4. In another embodiment, $T_{t1}$ may be a register that contains the time at which the signal has left the transmitter and $T_{r1}$ is a register that contains the time at which the signal is received. In such case: $T_{oA1}=(T_{r1}-T_{t1})+\delta t_1$ The coarse ToA estimate may be more than a fraction of $T_s$ away from the actual $T_{oA1}$ depending on the receiver synchronization strategy. For example, typical OFDM receivers may advance their synchronization reference by a few $T_s$ relative to the expected start of the symbol as obtained by a time-domain correlator to avoid inter-symbol interference due to pre-echoes. Consequently, the receiver timing offset $\delta t_1$ may be greater than $T_s$ and include this intentional synchronization advance of one or more $T_s$ at the receiver and a fraction of $T_s$ due to inability of the sampling process to determine the precise boundary of the incoming signal.

In one scenario, the object 8 passively reflects the ranging signal 3, so that the return signal 5 that is received by the transceiver 10 from the object 8 is simply a portion of the ranging signal 3 reflected from the object 8. For electromagnetic waves, assuming that the reflection itself is instantaneous and the propagation velocity in the medium is the speed of light, commonly denoted as "c", the transceiver 10 may calculate the distance d to the object 8 according to equation (1):

$$D=c \cdot \text{ToF}, \quad (1)$$

where ToF is a so-called time of flight of the ranging CM signal between the transceiver 10 and the object 8, which can be computed based on equation (2):

$$\text{ToF}=(T_{r1}+\delta t_1-T_{t1})/2. \quad (2)$$

This scenario is also referred to herein as passive ranging, wherein the transceiver 10 functions as a multi-frequency radar (M-radar). Distances that can be measured in this scenario are limited by the reflectivity of the object, the CM signal's spreading in space during propagation, the receiver sensitivity at the transceiver 10 and the level of rejection/discrimination at the receiver for the transmitted signal if the returned CM signal begins to be received while the signal transmission is still on-going. In passive ranging, if the needed signal rejection/discrimination is not feasible, the time span of the CM signal used may need to be adjusted to be smaller than the expected flight time of the signal cumulated in both directions.

In one embodiment, the first transceiver 10 incorporates a ranging processor 6 for performing ranging calculations to generate an estimate for the receiver timing offset $\delta t_1$ as described hereinbelow, and to compute the flight time ToF and/or the distance d. In some embodiments, the ranging processor 6 may be external to the first transceiver 10, and receives information required for computing $\delta t_1$, ToF and/or d therefrom. The CM transmitter 2 may incorporate digital processor for digitally generating CM signals, a digital-to-analog converter (DAC) for converting the CM signal into an analog signal, and analog circuitry for frequency up-converting the CM signal as known in the art. In one embodiment, the CM transmitter 2 is an OFDM transmitter designed for generating and transmitting OFDM signals as known in the art. In other embodiments, the CM transmitter 2 may utilize other types of CM signals, such as pre-computed multicarrier waveforms or a series of time-sequenced single or multiple carrier transmissions.

In one embodiment, the receiver 4 is a CM receiver, for example an OFDM receiver if the return signal 5 utilizes OFDM, and includes components necessary for receiving, optionally down-converting in frequency as required, sampling and de-multiplexing received CM signals into constituent subcarriers for processing to extract subcarrier information. This subcarrier information may include amplitude and phase level information for the subcarriers, or be in the form of subcarrier I (in-phase) and Q (quadrature) values.

In one embodiment, the receiver 4 may lack components required for extracting subcarrier-level information from the received return CM signal; in such embodiments, the receiver 4 includes circuitry required for receiving and down-converting CM signals, performing frequency and time synchronization of the local sampling clock to the received signal, identifying the return CM signal as a ranging signal, and for transforming thereof into the discrete sampled CM signal $Y_1$.

Figure 1B:
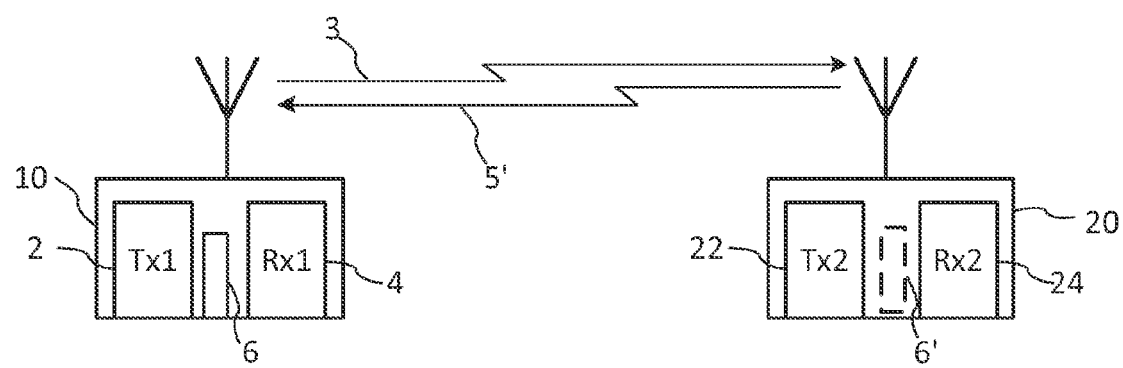

Turning now to FIG. 1B, there is illustrated a scenario wherein the object 8 is a second communication device 20, such as a second transceiver. In this scenario, the transceivers 10 and 20 exchange ranging CM signals to determine the distance d therebetween in a ranging process according to embodiments of the present invention. The second transceiver 20 includes a second receiver 24, labeled in the figure 'Rx2', for receiving the first ranging signal 3, and a second CM transmitter 22, labeled in the figure 'Tx2', for transmitting the return CM signal 5' in the form of a second ranging signal to be received by the first transceiver 10. Accordingly, the return signal 5' in this embodiment is no longer a reflected portion of the first ranging signal 3, but a new, second ranging signal generated by the second transceiver 20. The return signal 5' may utilize a different set of subcarriers for the purpose of ranging. The second receiver 24 and the second CM transmitter 22 may be as described with respect to the first receiver 4 and the first transmitter 2, respectively.

During the ranging process, the first transceiver 10 generally operates as described hereinabove with reference to FIG. 1A. It records the first transmission start time $T_{t1}$ at which the first ranging CM signal 3 leaves the first transceiver 10 and the first sampling start time $T_{r1}$ for the received return CM signal, and computes the first receiver timing offset $\delta t_1$ using the ranging processor 6 as generally described hereinabove with reference to FIG. 1A, and is described hereinbelow more in detail.

Upon receiving the first ranging CM signal 3, the second transceiver 20 transforms it into a second sampled CM signal $Y_2$ using a local sampling clock that is synchronized in frequency to the transmitter frequency reference and coarsely in time to the transmitter time reference, both contained in the received CM signal 3. The second transceiver 20 also records a start time $T_{r2}$ at which the first ranging signal was received, corresponding to the timing of a reference first sample in the sampled CM signal $Y_2$ relative to the local sampling time reference. The start time $T_{r2}$ is also referred to herein as a second sampling start time, which may be used as a second coarse ToA estimate. In one embodiment, the second sampling start time $T_{r2}$ is defined on a time grid spaced by the baseband sampling time period of the second transceiver 20, which is assumed hereinbelow to be equal to the corresponding sampling time period $T_s$ at the first transceiver 10. In one aspect of the invention, processing of the received first ranging CM signal 3 by the receiver 24 is done so that subcarrier phase information in the sampled CM signal $Y_2$ is preserved. In one embodiment, the sampled CM signal $Y_2$ is generated by sampling the received CM signal 3 at baseband in the complex plane, documenting the I&Q values of each sample acquired every sampling period $T_s$.

According to an aspect of the present invention, the second sampled CM signal $Y_2$ obtained from the first ranging signal 3 at the second transceiver 20 is used to compute a second sampling offset $\delta t_2$ at the second receiver 24 with a time resolution of a fraction of the sampling period $T_s$ using the subcarrier amplitude and phase information contained in $Y_2$, and also using information about subcarrier modulation of the first ranging CM signal 3 performed at the transmitter 4. The second sampling offset $\delta t_2$ can then be used to correct the second coarse ToA estimate $T_{r2}$ to obtain a corrected ToA $T_{oA_2}$ that more accurately estimates the exact time of arrival of the first ranging signal 3 at the second transceiver 20, with time resolution down to a small fraction of the sampling period $T_s$, $T_{oA_2} = T_{r2} + \delta t_2$.

The second transceiver 20 may transmit the return CM signal 5' either in response to receiving the first ranging signal 3 from the transceiver 10, or upon receiving a signal from a ranging server. In other embodiments, both transceivers may transmit their respective ranging signals at prescribed time instances or events, or otherwise as desired and suitable for determining the distance d.

During the ranging process, the second transceiver 20 records a time instance $T_o$ at which the leading end of the second ranging signal 5' leaves the transceiver; this time instance is also referred to hereinbelow as the second transmit start time.

In one embodiment, the acts of recoding the second sampling start time $T_{r2}$ and the second transmission start time $T_{t2}$ may be in the form of starting and stopping a local clock counter. For example, when the second transceiver 20 transmits the return CM signal 5' in response, and after, receiving the first ranging signal 3, the local clock counter at the second transceiver 20 is started at the start of the sampling of the first ranging signal 3, and is stopped when the second ranging CM signal 5' leaves the second transceiver 20; in this embodiment, $T_{r2} = 0$, and $T_{t2}$ is, for example, the number of periods $T_s$ of the local sampling clock between the start time for the sampling of the first ranging CM signal 3 at the transceiver 20, and the time when the front end of the return CM signal 5' leaves the receiver 24. In one embodiment, a correction factor "con" is included to account for signal delays in RF paths within the transceiver 20. In embodiments where antennas of the second transmitter 24 and the second receiver 24 are not co-located, appropriate corrections may also be included in the correction factor "con".

The total time of flight ToF of the CM signals between the transceivers 10 and 20 may be estimated using equation (4):

$$\text{ToF} = (T_{r1} - T_{t1} + \delta t_1 + T_{r2} - T_{t2} + \delta t_2 + \text{corr})/2, \quad (4)$$

wherein the first timing offset $\delta t_1$ is obtained as described hereinabove with reference to FIG. 1A from the return sampled CM signal $Y_1$.

In one embodiment, the second timing offset $\delta t_2$ is computed by the second transceiver 20, and then communicated to the first transceiver 10 together with $T_{t2}$ and $T_{r2}$ to enable the computation of the ToF or the distance d at the transceiver 10. The second transceiver may utilize its own ranging processor 6' for computing the second timing offset $\delta t_2$ from $Y_2$, or may utilize processing capabilities of the receiver 24 for performing all or most of the required processing, as described hereinbelow by way of example. In the case of partial processing at the transceiver 20, different information vectors may need to be sent to the transceiver 10 instead of $\delta t_2$ as explained hereinbelow. Note that the term 'processor' as used herein does not necessarily mean separate hardware, but also encompasses a functional block defined within a larger hardware processor, so that the transceivers 10 and 20 may each include one hardware processor, or a set of shared hardware processors, that performs all or some of the data processing functions that are associated with the corresponding receiver, transmitter and ranging processor.

In one embodiment, the second timing offset $\delta t_2$ is computed by the second transceiver 20, which also receives the first timing offset $\delta t_1$, the first sampling start time $T_{r1}$ and the first transmission start time $T_{t1}$ from the first transceiver 10, and computes the flight time ToF and/or d. In the case of partial processing at the transceiver 10, different information vectors may be sent to the transceiver 20 instead of $\delta t_1$ as described hereinbelow.

In the embodiments described hereinabove, one or both of the transceivers 10, 20 includes a ranging processor for computing one or both of the first and second receiver sampling offsets, and for computing the ToF and/or distance. This may require adding extra processing capabilities to the transceivers, which may not always be desirable.

Figure 1C:
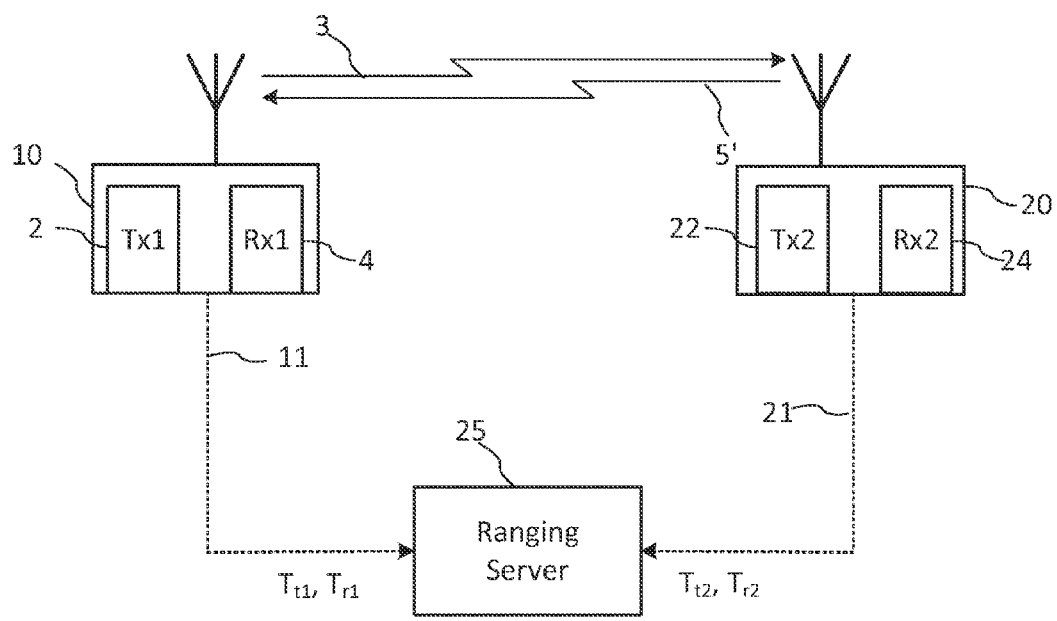
FIG. 1C is a diagram illustrating two transceivers exchanging CM signals for measuring a distance therebetween in a communication system with a ranging server.

Referring now to FIG. 1C, there is illustrated another scenario wherein the first and second transceivers 10 and 20 exchange ranging CM signals 3, 5' generally as described hereinabove with reference to FIG. 1B, but wherein at least some of the data processing associated with the computations of the ToF value or the distance is performed by a ranging server 25 that is external to both the first and second transceivers 10 and 20. In one embodiment, the ranging server may initiate the ranging process by sending a 'perform ranging' signal to one or both of the transceivers 10 and 20, while in another embodiment or in other circumstances the ranging process may be initiated by either of the transceivers 10 and 20. In both cases, the first and second transceivers 10, 20 send the values of $T_{t1}$, $T_{r1}$, $T_{t2}$, $T_{r2}$, and information from which the receiver timing offsets $\delta t_1$ and $\delta t_2$ can be derived using principles of the present invention, to the ranging server 25, which then performs operations required to compute the ToF value and/or the distance d. Transmission of these data may be accomplished for example wirelessly using the transmitters 2 and 22, or any other means of communication with the ranging server that is available to the transceivers 10 and 20 such as over the internet or other communication networks, or over wired connections.

In one embodiment, one or each of the transceivers 10 and 20 passes the respective sampled ranging CM signals $Y_1$ and/or $Y_2$ to the ranging server 25, which then computes respective receiver timing offset values therefrom.

In one embodiment, one or each of the transceivers 10 and 20 first performs partial data processing of the respective sampled ranging CM signals $Y_1$ and/or $Y_2$, for example using built-in capabilities of the respective receivers, and passes a digital signal resulting from this processing to the ranging server 25, which then computes respective receiver timing offset values therefrom.

In one embodiment, one or each of the transceivers 10 and 20 first performs partial data processing of the respective sampled ranging signals $Y_1$ and/or $Y_2$, for example using built-in capabilities of the respective receivers, and passes a frequency-domain representation of the respective sampled ranging signals $Y_1$ and/or $Y_2$ such as $\text{FFT}(Y_1)$ and/or $\text{FFT}(Y_2)$, to the ranging server 25, which then computes respective receiver timing offset values therefrom. The frequency domain vectors may only contain the amplitude and phase, or I&Q values, of the subcarriers used for ranging, excluding unused subcarriers such as DC, guard bands subcarriers at the edges of the channel and any other subcarrier not used for ranging; the selection of subcarriers participating in ranging may be done by applying a 'mask' vector $P_{mask}$ to the frequency domain vectors, i.e., $P_{mask} \cdot \text{FFT}(Y_1)$ and/or $P_{mask} \cdot \text{FFT}(Y_2)$, thus potentially resulting in smaller size vectors.

In one embodiment, one or each of the transceivers 10 and 20 first performs partial data processing of the respective sampled ranging CM signals $Y_1$ and/or $Y_2$, for example using built-in capabilities of the respective receivers and passes a complex channel impulse response (CCIR) of the respective sampled ranging CM signals $Y_1$ and/or $Y_2$ to the ranging server 25. This CCIR is obtained through the generation of the frequency representation of these signals from which the unused subcarriers are removed by using the 'mask' $P_{mask}$ as described hereinabove and by removing modulation X that may be applied to the ranging subcarriers at the transmitter, for example using a pseudo-noise sequence (PNS) generator to randomize the ranging CM signal, and bringing this signal to its time-domain representation to obtain the $CCIR=IFFT\{P_{mask} \cdot FFT(Y)/X\}$. The ranging server 25 can then compute therefrom the respective receiver timing offset values. The CCIR vectors may be limited to the time samples that contain the amplitude and phase, or corresponding I&Q values, over a time span where a single channel path or multiple channel paths exist, thus resulting in smaller size vectors.

In one embodiment, one or each of the transceivers 10 and 20 performs most of the data processing of the respective sampled ranging CM signals $Y_1$ and/or $Y_2$, for example using built-in capabilities of the respective receivers and computes the respective receiver timing offset $\delta t_1$ and/or $\delta t_2$, and passes its value to the ranging server 25.

In one embodiment, the sampled ranging CM signals $Y_1$ and/or $Y_2$ are each a complex baseband signal, such as in the form of I and Q signal sequences. In one embodiment, the ranging CM signals 3, 5' may be sampled at the RF carrier frequency or at an intermediate frequency (IF), resulting in real-valued sampled CM signals that preserve relative subcarrier phase information. This real-valued signals can then be sent to a remote processor for processing, which may include converting it into discrete complex baseband signals.

In one embodiment, the ranging server 25 may be on-site with one of the transceivers 10 and 20. By way of example, the first communication device 10 may be a Base Station (BS) and the second communication device 20 may be a Customer Premise Equipment (CPE) of a wireless regional area network (WRAN) according to the IEEE 802.22 standard "IEEE 802.22™/P802.22/D7.0, December 2010, Draft Standard for Wireless Regional Area Networks Part 22: Cognitive Wireless RAN Medium Access Control (MAC) and Physical Layer (PHY) specifications: Policies and procedures for operation in the TV Bands IEEE Std 802.16-2009, IEEE Standard for Local and Metropolitan Area Networks Part 16: Air Interface for Broadband Wireless Access Systems, May 2009", and the ranging server 25 is located at the same site with the BS 10.

In one embodiment, the ranging server 25 is located remotely from both the first transceiver 10 and the second transceiver 20, and communicates with them either wirelessly or using a wired connection, such as over the internet or other communication network.

Figure 1D:
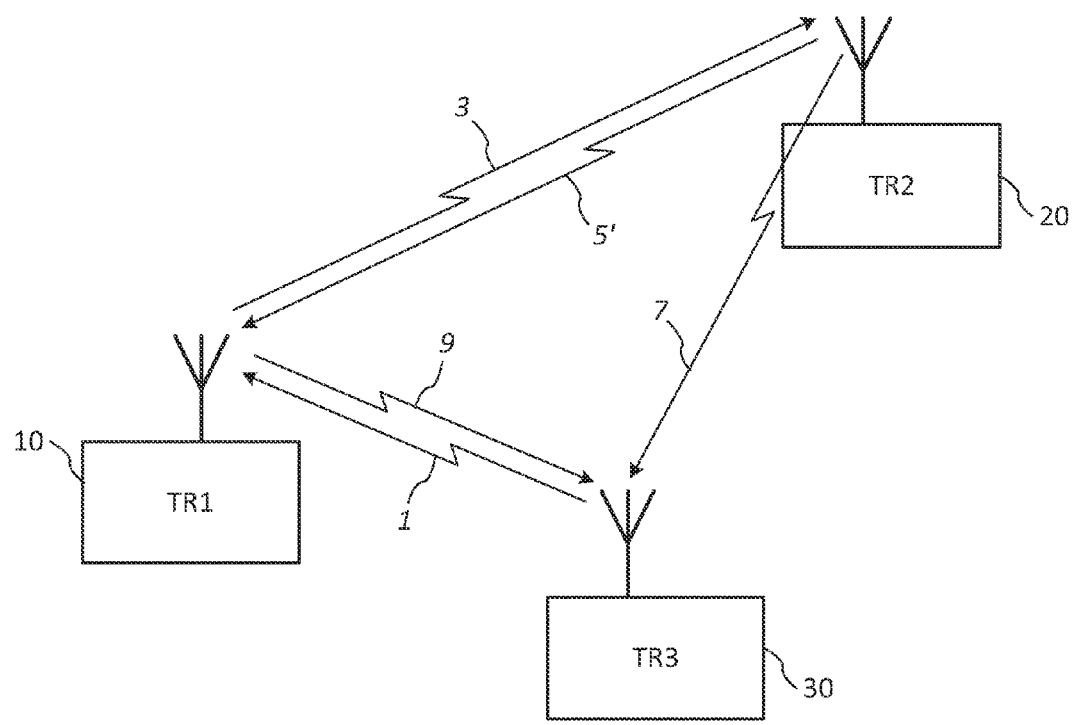
FIG. 1D is a diagram illustrating a transceiver exchanging CM signals with two other transceivers to determine a geolocation thereof.

Turning now to FIG. 1D, there is illustrated a scenario wherein three transceivers 10, 20 and 30 communicate with a goal to establish a geo-location of one of the transceivers based on known location of two other transceivers. By way of example, the first transceiver 10 is a BS and the second transceiver 20 and third transceiver 30 are two CPEs. While the BS 10 exchanges ranging signals as described hereinabove with reference to FIG. 1B to determine the time-of-flight $ToF_{12}$ between the first transceiver 10 and the second transceiver 20, and the time-of-flight $ToF_{13}$ between the first transceiver 10 and the third transceiver 30, a third ranging process is initiated by the BS 10 with the second transceiver 20, by asking this second transceiver to broadcast a same or different CM ranging burst at a specified delay $Tdelay_2$, defined in number of sampling periods relative to its local reference timing $Tref_2$. The BS 10 also asks, as part of its ranging with the third transceiver 30, to capture the CM ranging burst received from the second transceiver 20 while keeping its synchronization with the BS 10. For convenience, the timing reference at the BS, $Tref_1$, can be chosen as the time at which the front end of the first ranging signal leaves the transceiver 10, i.e., $T_{t1}$ as defined above. The timing reference at the second transceiver 20, $Tref_2$, is then the time at which this first ranging signal is received, i.e., $T_{r2}$ as defined above, which corresponds to the second coarse ToA estimate. The timing reference at the third transceiver 30, $Tref_3$, is also the time at which this first ranging signal is received, i.e., $T_{r3}$, similar to $T_{r2}$ for the second transceiver.

The local reference timing $Tref_2$ at the second transceiver 20 relative to the reference timing $Tref_1$ at the BS 10 can be found as follows from the first ranging process:

$$Tref_2 = Tref_1 + ToF_{12} - \delta t_2 \quad (5)$$

The local reference timing $Tref_3$ at the third transceiver 30 relative to the reference timing at the BS 10 can be found as follows from the second ranging process:

$$Tref_3 = Tref_1 + ToF_{13} - \delta t_3 \quad (6)$$

where, $\delta t_i$ is the receiver timing offset for the $i^{th}$ transceiver as defined above.

The signal flight time between the second transceiver 20 and the third transceiver 30 is the difference between the time at which the ranging signal is transmitted by the second transceiver and the time that it is received by the third transceiver and can be expressed as follows:

$$ToF_{23} = Tref_3 - Tref_2 + Tdelay_2 + \delta t_{23}, \quad (7)$$

where $ToF_{23}$ is a ranging signal flight time between transceivers 20 and 30, $Tdelay_2$ is a delay specified by the BS 10 relative to the local time reference at the transceiver 20, in number of sampling periods, that the transceiver 20 needs to wait before starting to transmit its ranging signal toward surrounding CPEs, $\delta t_{23}$ is a timing offset measured at the transceiver 30 for the ranging signal received from transceiver 20 relative to the local time reference. This timing offset can be calculated locally or the information indicative of this timing offset can be provided for processing by a ranging server.

Inserting equation 5 and 6 into 7, re-arranging and eliminating $Tref_1$ allows the calculation of the ranging signal flight time between transceivers 20 and 30 based on parameters found by these three concurrent ranging processes. Note that these three ranging processes can be done consecutively but the probability of inaccuracy due to possible sampling clock slippage or jitter may increase as the time period over which these consecutive processes take place increases.

$$ToF_{23} = (ToF_{13} - ToF_{12}) - (\delta t_3 - \delta t_2) - Tdelay_2 + \delta t_{23} \quad (8)$$

In one embodiment, a few trials may be needed wherein $Tdelay_2$ is adjusted by the BS 10 so that $\delta t_3$ is kept to a small value to avoid transceiver 30 sampling outside the ranging burst received from transceiver 20.

Once the three signal flight times are known between the three transceivers 10, 20 and 30, the three distances therebetween can be calculated according to equation (1), and when the geographic location of two of these transceivers is known, well established geo-location techniques such as triangulation can be used to determine a 2-dimensional geo-location (e.g., latitude and longitude) for the third transceiver.

Figure 1E:
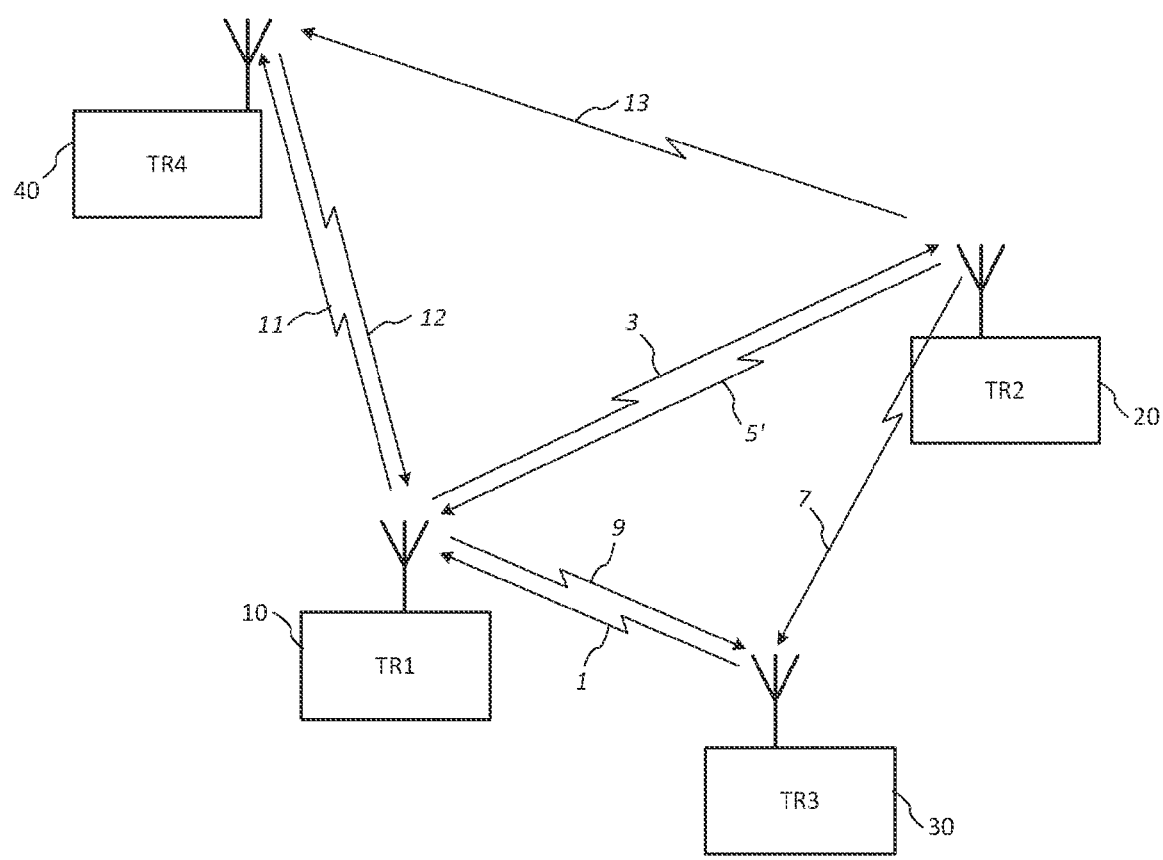
FIG. 1E is a diagram illustrating a transceiver exchanging CM signals with three other transceivers to determine a 3-dimensional geolocation thereof.

Turning now to FIG. 1E, there is illustrated a scenario wherein four transceivers 10, 20, and 40 communicate with a goal to establish a 3-dimensional geo-location (e.g., latitude, longitude and altitude) of one of the transceivers based on known location of three other transceivers. By way of example, the first transceiver 10 is a BS and the second transceiver 20, the third transceiver 30 and the fourth transceiver 40 are three CPEs. While the BS 10 exchanges ranging signals as described hereinabove with reference to FIG. 1B to determine the time-of-flight $ToF_{12}$ between the first transceiver 10 and the second transceiver 20, the time-of-flight $ToF_{13}$ between the first transceiver 10 and the third transceiver 30, and $ToF_{14}$ between the first transceiver 10 and the fourth transceiver 40, a fourth ranging process is concurrently initiated by the BS 10 with the second transceiver 20, by asking this second transceiver to broadcast a same or different CM ranging burst at a specified delay $Tdelay_2$, defined in number of sampling periods relative to its local reference timing $Tref_2$. The BS 10 also asks, as part of its ranging with the third and fourth transceivers 30 and 40, to capture the CM ranging burst received from the second transceiver 20, while keeping their synchronization with the BS 10. Similarly to the 2-dimensional geo-location case described above, the timing reference at fourth transceiver 40 ($Tref_4$) is also the time at which this first ranging signal is received, i.e., $T_{r4}$, similar to $T_{r2}$ and $T_{r2}$ for the second and third transceivers respectively.

Referring to the scenario illustrated in FIG. 1D, $Tref_2$, $Tref_3$ and $ToF_{23}$ are calculated according to equations 5, 6, 7 and 8.

The local reference timing $Tref_4$ at the fourth transceiver 40 relative to the reference timing at the BS 10 can be found as follows from the third ranging process:

$$Tref_4 = Tref_1 + ToF_{14} - \delta t_4 \qquad (9)$$

The signal flight time between the second transceiver 20 and the fourth transceiver 40 is the difference between the time at which the ranging signal is transmitted by the second transceiver and the time that it is received by the fourth transceiver and can be expressed as follows:

$$ToF_{24} = Tref_4 - Tref_2 + Tdelay_2 + \delta t_{24}, \qquad (10)$$

where $ToF_{24}$ is a ranging signal flight time between transceivers 20 and 40, $Tdelay_2$ is a delay specified by the BS 10 relative to the local time reference at the transceiver 20, in number of sampling periods, that the transceiver 20 needs to wait before starting to transmit its ranging signal toward surrounding CPEs, $\delta t_{24}$ is a timing offset measured at the transceiver 40 for the ranging signal received from transceiver 20 relative to the local time reference. This timing offset can be calculated locally or the information indicative of this timing offset can be provided for processing by a ranging server.

Inserting equation 5 and 9 into 10, re-arranging and eliminating $Tref_1$ allows the calculation of the ranging signal flight time between transceivers 20 and 40 based on parameters found by these three ranging processes. Note that these three ranging processes can be done consecutively but the probability of inaccuracy due to possible sampling clock slippage or jitter may increase over extended time periods.

$$ToF_{24} = (ToF_{14} - ToF_{12}) - (\delta t_4 - \delta t_2) - Tdelay_2 + \delta t_{24} \qquad (11)$$

In one embodiment, a few trials may be needed wherein $Tdelay_2$ is adjusted by the BS 10 so that both $\delta t_3$ and $\delta t_4$ can be kept to small values to avoid transceivers 30 and 40 sampling outside the ranging burst received from transceiver 20.

Once the five signal flight times between the four transceivers 10, 20, 30 and 40 have been obtained by these five concurrent processes, the five distances therebetween can be deduced according to equation (1), and when the 3-dimensional geographic location of three of these transceivers is known, well established geo-location techniques such as triangulation can be used to determine the 3-dimensional geo-location of the fourth transceiver, in this example case, transceiver 20. Note that these five ranging processes can be done consecutively but the probability of inaccuracy due to possible sampling clock slippage or jitter may increase as the time period over which these consecutive processes take place increases. Note that more transceivers can be geolocated through such concurrent or nearly concurrent ranging processes as long as the transmission channel has sufficient capacity to carry the needed ranging burst transmissions. Note also that this 3-dimensional geolocation process requiring three transceivers with known location and one to be geolocated could also be done by using the earlier described 2-dimensional geolocation process for geolocating one transceiver with two transceivers at known locations and repeating the process by replacing one transceiver at a known location with another transceiver at another known location. The above concurrent or nearly concurrent 3-dimensional geolocation process can be done more quickly in one step in a point-to-multipoint network topology where the base station drives the process.

FIGS. 1B-1C illustrate embodiments wherein the ranging CM signals 3, 5' are wireless, and the transceivers 10 and 20 are wireless transceivers. However, the present invention may also be applied to wireline communication systems, such as fiber-optic and coaxial cable systems which use optical and cable transceivers, respectively. Methods and systems provided by the present invention can also be used in such systems to determine distances between transceivers, or from a transceiver to a passive element, as in FIG. 1A, such as a cable termination or a fiber break, or any combination thereof, with an accuracy far exceeding the receiver sampling time period.

Having described examples of various possible scenarios wherein aspects of the present invention can be utilized, we now turn to describing exemplary embodiments of the invention in further detail with reference to OFDM signals and OFDM-based communication devices. OFDM signals represent one example of CM signals that is currently finding applications in many areas of communication. However, it will be appreciated that many aspects of the invention are also applicable to other types of CM signals, so that embodiments of the present invention may utilize other types of CM signals as will become evident to those skilled in the art from the current description, and such embodiments are within the scope of the present invention.

Figure 2:
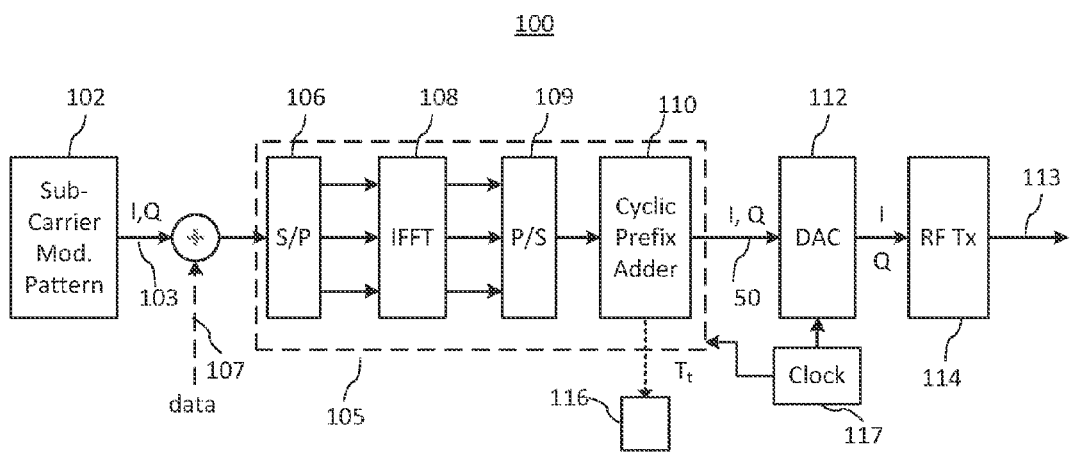
FIG. 2 is a schematic block diagram of a transmitter for transmitting a ranging CM signal according to an embodiment of the present invention.

Referring now to FIG. 2, there is schematically illustrated an exemplary OFDM transmitter 100 for generating ranging OFDM signals. The OFDM transmitter 100 represents one possible embodiment of the transmitters 2 and 22 in the ranging scenarios illustrated in FIGS. 1A to 1D. Since OFDM transmitters are well known in the art, the description hereinbelow will concentrate mainly on aspects that are specific to the present invention or useful in the understanding thereof. A detailed description of a typical prior-art OFDM system can be found for example in U.S. Pat. No. 5,732,113 issued to Schmidl et al, which is incorporated herein by reference.

The OFDM transmitter 100 includes a subcarrier modulation pattern generator (SMPG) 102 for generating and/or storing a subcarrier modulation pattern (SMP) X 103. The SMPG 102 is coupled at its output to an OFDM symbol generator 105, which includes a serial-to-parallel converter

106, an IDFT processor 108, a parallel-to-serial (P/S) converter 109 and CP (cyclic prefix) adder 110 connected in series. The OFDM symbol generator 102 utilizes SMP 103 to modulate a plurality of OFDM subcarriers, and forms therefrom one or more OFDM symbols. Hereinafter we will denote the total number of subcarriers in one OFDM symbol as N, while the number of subcarriers used for ranging will be denoted as M, which can be equal or less than N but exceeds 1. The SMP 103 can be presented in the form of a sequence of N complex m-ary modulation symbols X(k), k=1, ..., N, which is passed to the OFDM symbol generator 105 in the form of two discrete modulation sequences: an in-phase modulation sequence I(k) and a quadrature modulation sequence Q(k). The IDFT processor 108 is programmed or hard-wired to perform an inverse discrete Fourier transform (IDFT) of size N or, preferably, an inverse fast Fourier transform (IFFT) on the input sequence of N complex m-ary symbols X(k) to transform it from the frequency domain to the time domain as known in the art. The OFDM transmitter 100 may utilize different modulation formats for modulating the OFDM subcarriers forming the ranging signal, including but not limited to PSK, QPSK, and QAM modulation formats. Note that this same OFDM transmitter can be used for data transmission if a subcarrier modulation pattern 107 is used rather than 103 as described above.

In one embodiment, the SMPG 102 includes a pseudo-random bit sequence generator for generating a pseudo-noise sequence (PNS), as known in the art and a bit mapper that performs an m-ary quadrature amplitude modulation (MQAM) encoding of the generated PNS, mapping thereby PNS bits to complex-valued points in an m-ary constellation. Each complex-valued point in the constellation represents discrete values of phase and amplitude of a particular subcarrier. Those of the N subcarriers that are not included in the set of M subcarriers used for the CM ranging signals may be set to zero, i.e., I(k)=0 and Q(k)=0.

The sequence of N m-ary symbols X(k) of the resulting SMP 103 is then used by the IDFT processor 108 as frequency-domain complex modulation coefficients for modulating N frequency-domain subcarriers, thereby forming an N-point DFT symbol defined as $$x(n) = \frac{1}{\sqrt{N}} \sum_{k=0}^{N-1} X(k) e^{j2\pi \frac{nk}{N}}, n = 0, 1, 2, \ldots, N-1. \quad (9)$$

In equation (9), the complex modulation coefficient X(k) represents both amplitude and phase modulation of a k-th subcarrier, as defined by the chosen subcarrier modulation pattern X 103.

The DFT symbol defined by equation (9) is then passed onto the P/S converter 109 which converts it into a serial representation of the signal in the time domain, where it is represented by a sequence of N digital samples spaced by time intervals Ts, where Ts represents the sampling interval, which is related to the frequency spacing between subcarriers f=1/(NTs). The time-domain DFT symbol is then extended by the CP adder 110 with the insertion of a cyclic prefix (CP) at the beginning thereof to protect it from channel-induced inter-symbol interference (ISI). ISI typically appears due to multipath interference during channel propagation causing a channel delay spread at signal reception wherein multiple echoes of the signal may appear. The duration of the CP is chosen to exceed the channel delay spread so that this time buffer between successive DFT symbols can absorb the channel multipath, hence avoiding ISI. The CP is typically a copy of the end portion of the DFT symbol appended at the beginning of the symbol. Alternatively, a cyclic postfix can be used where a copy of a portion of the beginning of the symbol is appended to at the end of the DFT symbol.

Figure 3:
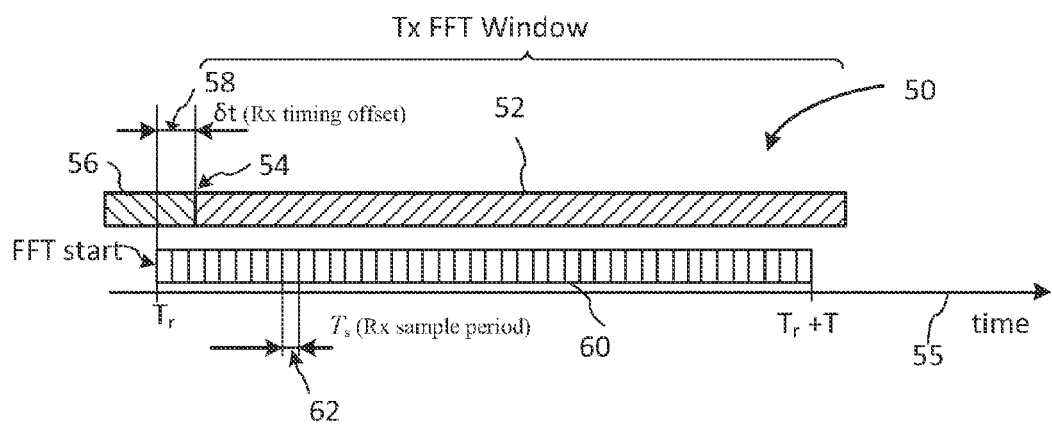
FIG. 3 is a diagram illustrating a ranging OFDM signal and a receiver timing offset 64.

The time-domain CP-extended DFT symbol at the output of the OFDM symbol generator 105 forms an OFDM symbol 50. This OFDM symbol is schematically illustrated in FIG. 3, wherein the CP portion and the IDFT symbol portion are indicated with reference numeral '56' and '52', respectively. The beginning of the portion 52 of the OFDM symbol 50 that corresponds to the IDFT symbol is indicated at 54, and will also be referred to as the start of the ranging signal. In another embodiment, the OFDM symbol 50 may be a pre-computed sequence stored in the transmitter 100 or sent thereto via a communication means to reduce the cost and/or complexity of the transmitter 100; i.e., the OFDM symbol 50 does not need to be computed locally or in real-time at the transmitter 100, but can be pre-computed and stored in an on-board memory.

The cyclically extended digital time-domain OFDM symbol 50 in the form of discrete time-domain I and Q sequences is then clocked using a local reference sample clock 117 and passed to a digital-to-analog converter (DAC) 112 to be transformed into analog domain, and is then fed into an RF transmitter unit 114 to produce the ranging OFDM signal 113. Various known in the art designs of the RF transmitter 114 can be used; typically, the RF transmitter unit 114 includes a low-pass filter, an RF modulator coupled to an RF local oscillator for frequency up-converting the signal into an RF frequency range, a power amplifier and an antenna. Typical embodiments of these elements and the RF transmitter unit 114 can be found, for example, in U.S. Pat. No. 5,732,113.

The OFDM transmitter 100 may further include memory 116 for storing the transmission start time $T_t$, which corresponds to the time instance when the front end 54 of the OFDM symbol 50 leaves the transmitter 114, as measured using the local transmitter sample clock 117. In one embodiment, the memory 116 may be in the form of a timer that starts to count up in sampling clock cycles when the first sample of the IDFT symbol leaves the transmitter 114, i.e., when all the samples of the cyclic prefix have already left the transmitter; this timer is then stopped when a return ranging signal is received by a co-located receiver, as described hereinabove. In one embodiment, $T_t$ may also account for signal delays in the circuitry of the transmitter 100 between the DAC 112 and a transmit antenna thereof (not shown), including possible signal delays in the antenna and a cable leading from 100 to the antenna.

In OFDM systems, the tolerance on the frequency stability of the sample clock at the transmitter and its recovery as the local sampling clock at the receiver may be very tight due to the fact that any slippage would result in subcarrier modulation spilling into adjacent subcarriers resulting into inter-carrier interference (ICI). By way of example, communication standards based on OFDM modulation may require that, at the BS, the transmitted center frequency, the symbol clock frequency and the sample clock frequency be derived from the same reference oscillator and that the BS reference frequency tolerance be better than ±2 ppm. At the CPE, the transmitted center frequency, the symbol clock frequency and the sampling frequency may be derived from the same reference oscillator and the transmit center frequency may be synchronized and locked to the frequency transmitted from the BS with a maximum tolerance of 2% of the subcarrier spacing; see, for example, IEEE Std 802.16-2009, IEEE Standard for Local and Metropolitan Area Networks Part 16: Air Interface for Broadband Wireless Access Systems, May 2009.

The modulation pattern X 103 used for modulating subcarriers of the ranging OFDM signal 113 will also be referred to herein as the ranging modulation pattern. Different ranging modulation patterns may be used for the purposes of the present invention, including two types of absence of modulation, i.e., I(k)=1 and Q(k)=0 for all or a selected group of the subcarriers that are used for ranging. In one embodiment, the ranging modulation pattern X is a pseudo-noise sequence (PNS) pattern; such patterns and methods of their generation are well known in the art. The use of a PNS pattern for subcarrier modulation for the purpose of ranging has certain advantages, as will be described herein in further detail. One such advantage is that it enables to reduce the so-called peak-to-average power ratio (PAPR) for the resulting time-domain OFDM signal, which enables to use a simpler power amplifier in the RF transmitter unit 114. In other embodiments, the modulation pattern X 103 may be selected so as to provide a particular time and frequency profile of the ranging signal, for example so as to emulate one of radar probing signals known in the art, such as a frequency-chirped waveform.

In one embodiment, the modulation pattern X is used to modulate the amplitude and phase of each of the N subcarriers forming the ranging OFDM symbol 50. In other embodiments, or in the same embodiment but at a different time, the ranging modulation pattern modulates only a selected subset of the subcarriers, with other subcarriers used for other purposes in the OFDM transmission, such as to transmit data. That can be accomplished, for example, by multiplexing the ranging modulation pattern X(k) with data modulation, wherein the selected subset of subcarriers is modulated using the ranging modulation pattern X(k), while the rest of the subcarriers is modulated with data symbols Xd(k) of a data stream 107.

Figure 4:
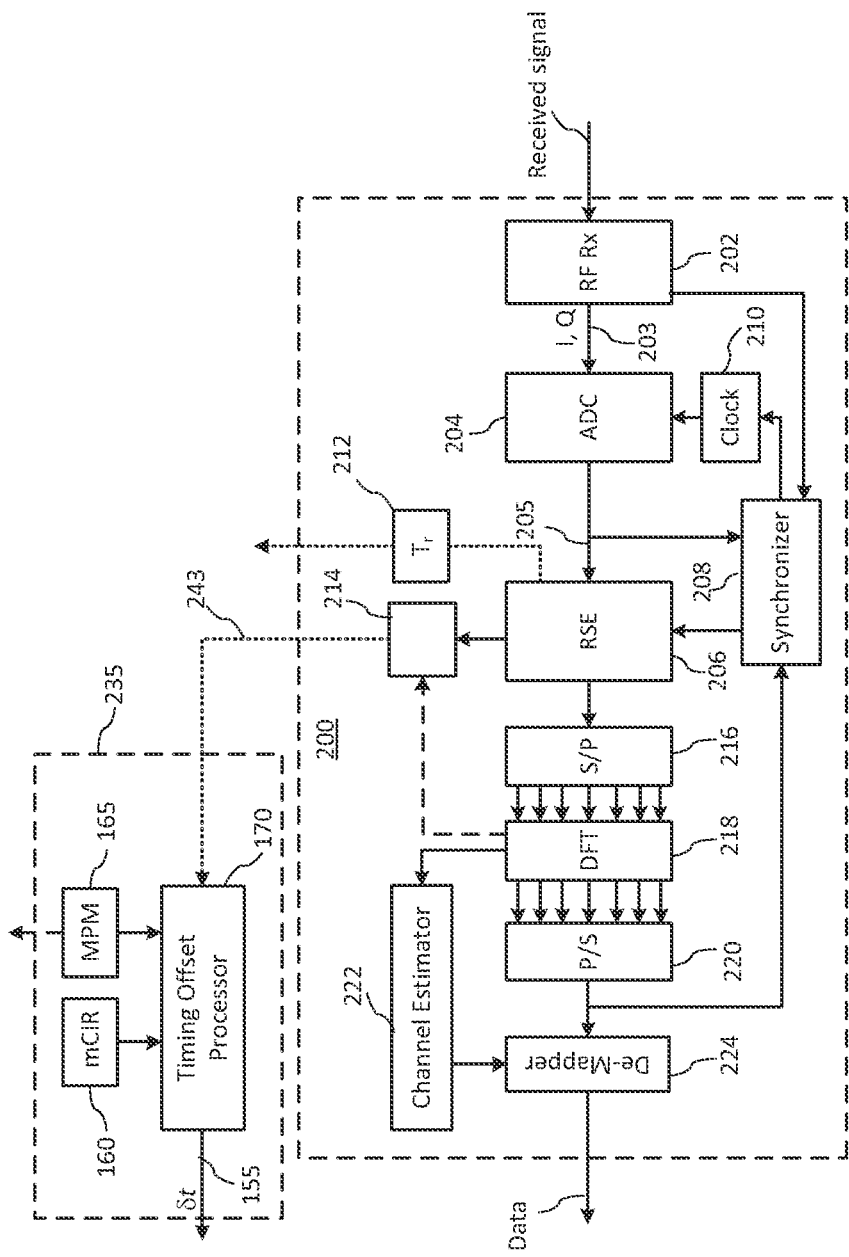
FIG. 4 is a schematic block diagram showing an exemplary receiver for receiving a ranging CM signal, and a timing offset processor for determining the receiver timing offset $\delta t$ for the received ranging CM signal.

With reference to FIG. 4, there is schematically illustrated an exemplary OFDM receiver 200 that includes at least some ranging-assisting features of the present invention. As shown, the OFDM receiver 200 includes main elements of a conventional OFDM receiver that are required for receiving and processing OFDM signals, such as RF front-end circuitry 202, receiver sample clock 210, an analog to digital converter 204, also referred to herein as sampler, synchronization and channel estimation units 208, 222, and an OFDM decoder, which is formed of an S/P converter 216 followed by a DFT processor 218 and a P/S converter 220, and which operates in reverse to the OFDM symbol generator 105 of the OFDM transmitter 100. In addition, the OFDM receiver 200 includes a ranging signal extractor (RSE) 206 for identifying the ranging OFDM symbol 50, extracting the sampled ranging signal Y corresponding thereto, and generating a sampling start time $T_r$ for the received ranging OFDM signal. The sampled ranging signal Y obtained by the RSE 206 is then optionally stored in memory 214, and passed to a timing offset processor (TOP) 170 for computing the timing offset δt of the receiver 200 as described hereinbelow.

In operation, the OFDM receiver 200 receives the ranging OFDM signal 113 after propagation thereof over a communication channel, for example wirelessly between two antennas (not shown). In OFDM receiver 200, received OFDM signals are first passed to the RF circuit 202 for initial processing thereof in analog domain as known in the art. In one embodiment, the RF receiving unit 202 performs signal amplification, channel filtering, carrier frequency recovery and de-multiplication, frequency down-conversion, low-pass filtering and quadrature demodulation as known in the art, so as to produce a frequency-down-converted OFDM signal 203 that preserves subcarrier relative phase information of the received OFDM signal. The resulting frequency-down-converted OFDM signal 203, for example in the form of two analog baseband quadrature signals I(t) and Q(t), is then passed to the ADC 204 for sampling and digitization. The ADC 204 produces a complex discrete signal at baseband that also preserves subcarrier relative phase information, for example in the form of discrete I and Q sequences representing discrete-time samples of the received OFDM signal spaced in time as long as the sampling time period $T_s$, which corresponds to a sampling rate $R=2/T_s$, exceeds the Nyquist rate $R_N$ for the received OFDM signal, i.e., $$R > R_N = 2F, \tag{10}$$

wherein F is the total modulation bandwidth of the OFDM signal 113.

The output of the ADC 204 is then passed to the synchronizer 208 for sampling clock frequency recovery as known in the art. This recovered clock frequency is used to trigger the sampling times in the receiver sample clock 210 to be provided to the ADC 204.

The output of the ADC 204 is also delivered to RSE 206, which identifies therein best-estimate boundaries of the ranging OFDM signal 113, and extracts a sequence of signal samples corresponding thereto, for example in the form of I and Q sequences, which is generally referred to herein as the sampled CM signal Y, or as the sampled ranging signal Y. The identification of the ranging signal boundaries may be accomplished in a variety of ways that would be evident to those skilled in the art. By way of example, in one embodiment, a time-domain signature of the SMP 103, which was used at the transmitter 100 to modulate the OFDM ranging signal 113, i.e., IDFT(X) is available to the receiver 200, and is utilized by the synchronizer unit 208 to search for a correlation peak between the ADC output signal 205 and this signature. In another embodiment, the frequency-domain signature of the SMP 103 itself is known at the receiver 200 and is utilized by the synchronizer unit 208 to search for a correlation peak between this frequency-domain signature and the received SMP 103 signal once it has gone through the DFT process, out of the parallel-to-serial converter 220. The synchronizer 208 obtains therefrom a time reference, and cooperates with the RSE 206 to estimate the position of the front end of the ranging OFDM signal 113 in the baseband sampled OFDM signal 205 received by the RSE 206. The sampling start time $T_r$ for the ranging signal is then set in accordance with this estimate, and is saved in memory 212 as the coarse ToA estimate, while the extraction of the discrete CM signal Y starts at that specific time. In one embodiment, the coarse ToA value saved in memory 212 additionally incorporates a receiver time delay accounting for various signal delays in the receiver circuitry between the receiver antenna (not shown) at the input of the RF receiver circuitry 202, and the output of ADC 204 of the receiver 200. In another embodiment, this receiver time delay may be stored and accounted for separately, and may be added to a receiver timing offset described hereinbelow.

In the OFDM embodiment described herein, the sampling start time $T_r$ defines the beginning of a DFT window of duration $N \cdot T_s$ that is subsequently used in processing of the ranging OFDM signal 113. It also corresponds to a first sample of the discrete CM signal Y that extends for a duration $N \cdot T_s$ of the IDFT symbol 52 generated at the OFDM transmitter 100.

Turning now back to FIG. 3, there is schematically illustrated the receiver DFT window 60 relative to the ranging OFDM symbol 50, with a time axis indicated at 55. To avoid inter-symbol interference due to multi-path propagation effects and depending on the synchronization strategy used in the receiver 200, the sampling start time $T_r$ may be selected to be safely within the CP region 56 of the OFDM symbol 50. In the presence of multipath, the OFDM signal that is received by the receiver 200 includes superimposed multiple-delay versions of the OFDM symbol 50, only one of which being shown in FIG. 3. The OFDM symbol 50 shown in FIG. 3 may be viewed as the one with a smallest propagation time delay; then the time offset 58 between the beginning of the receiver DFT window 60 at time instance $T_r$ and the front end 54 of the transmitter DFT window 52 in the received OFDM signal 50 corresponds to the receiver timing offset 64.

One aspect of the present invention relates a method and an apparatus for estimating the exact value of the receiver timing offset 58 with time resolution far better than was possible heretofore using known in the art approaches. One difficulty in determining the exact value of the timing offset 58 relates to the multipath propagation, as the receiver does not necessarily synchronize to the shortest-path component of the received OFDM signal. Another difficulty in determining the exact value of the timing offset 58 relates to the finite value of the baseband sampling time period $T_s$ used at the receiver 200. The synchronizer 208 selects among signal samples defined on the sampling time grid that is spaced by $T_s$; thus, the sampling time period $T_s$ defines the time resolution of the synchronization process, thereby limits the timing accuracy with which the FFT window 60 can be set relative to the ranging DFT symbol 52.

One aspect of the present invention provides a method for determining the receiver timing offset $\delta t$ 58 with time resolution that is a small fraction of the baseband sampling time period $T_s$, for example less than 10% thereof, and preferably about or less than 1% thereof. Furthermore, in the presence of multipath interference in the propagation channel, the method enables determination of receiver timing offsets relative to a plurality of multipath components with the same fine time resolution, thereby enabling determining relative propagation distances for different signal echoes with high accuracy.

Figure 5:
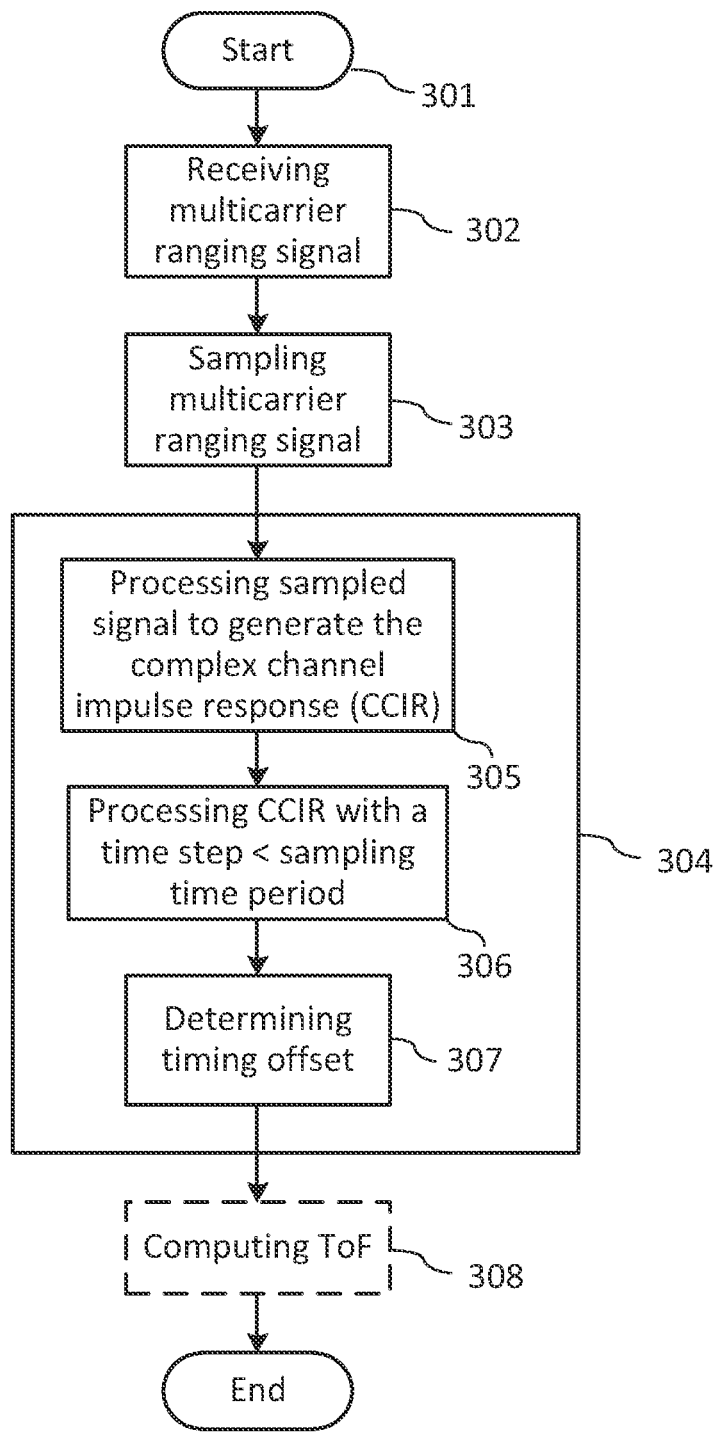
FIG. 5 is a flowchart of the method for determining the receiver timing offset according to an embodiment of the present invention.

The method for determining the receiver timing offset according to one embodiment of the invention will now be generally described with reference to a method flowchart given in FIG. 5.

The process starts at step 301, and proceeds to step 302 in which a CM ranging signal, such as the ranging OFDM signal 113, is received with a suitable receiver, such as the receiver 200 of FIG. 4, after the signal propagated through a communication channel. This step may include front-end signal processing such as that described hereinabove with reference to the receiver 200, and in particular the RF circuit 202.

In step 303, the received CM signal is sampled and transformed into a discrete CM signal Y that preserves relative subcarrier phase information. The discrete CM signal Y has a sample rate R that satisfies the Nyquist criterion (10).

Advantageously, sampling of the received signal at a sampling rate that satisfies the Nyquist criterion ensures that information about relative phase of the subcarriers in the received CM signal is preserved in the sampled baseband time-domain signal Y. In particular, the sampled CM signal Y retains the relative subcarrier phase information of the received CM signal, which allows the reconstruction of the signal at a time scale that is much smaller than the effective sampling period $T_s$ that defines the spacing of adjacent signal samples in the discrete CM signal Y. As disclosed in US patent Application 2010/0220012, which relates to the current application and is incorporated herein by reference, when a CM signal composed of multiple coherently frequency-multiplexed subcarriers propagates over a distance and is sampled at a different time than the time of the samples used to construct the original CM signal, the subcarriers acquire a relative phase difference therebetween that is proportional to the sampling time offset and the frequency spacing between the subcarriers. For a CM signal, a frequency spacing $\Delta f$ between the $i^{th}$ and $j^{th}$ subcarriers will result in a phase difference $\Delta \Phi_{ij}$ between these two subcarriers that is defined by equation (11):

$$\Delta \Phi_{ij} = 2\pi \Delta f \cdot \delta t, \quad (11)$$

wherein $\Delta t$ is the receiver sampling time offset 58 relative to the sampling time reference 54 used at the transmitter to build the CM ranging signal 113. As disclosed in '012, it is possible to determine the receiver sampling time offset with high accuracy exceeding the sampling time period based on equation (11) for a given accuracy of subcarrier phase measurement when utilizing subcarriers that are spaced suitably far apart in frequency. Thus, accurate $\delta t$ information on a scale finer than the sampling time period is retained in the subcarrier phases of the sampled signal, and can therefore be extracted by a suitable processing of the sampled CM signal Y. The propagation time of the signal, or the time of flight, can then be established, for example using equation (4), with a high accuracy, provided that the different timers involved at the transceivers are triggered by the local sampling clocks and that these clocks are synchronized in frequency.

Accordingly, in step 304 the sampled ranging signal Y is processed to determine the timing offset with sub-sampling resolution. In one aspect of the invention, this step includes generating a discrete complex channel impulse response (CCIR) in step 305, which is then processed in step 306 using a time step dt that is at least 2 times smaller than the sample time period $T_s$, so as to determine the timing offset $\delta t$ in step 307. This timing offset may be used in an optional step 308 to determine the time of flight for the received CM signal, such as in the M-radar scenario of FIG. 1A wherein the receiver is co-located with the transmitter that generated the ranging CM signal, and the coarse ToA value is determined using a single local clock counter.

The processing in step 305 may include a) determining the CCIR by converting the time-domain signal Y into its frequency-domain equivalent {DFT(Y)}; ii) removing a subcarrier modulation pattern X if one was used to modulate the ranging subcarriers at the transmitter {DFT(Y)/X}; iii), removing subcarriers that are not used for ranging by setting them to zero amplitude {$P_{mask} \cdot DFT(Y)/X$}; and iv) converting the resulting sequence back to the time domain to produce the complex channel impulse response in a concordance with equation (12):

$$CCIR = IDFT\{P_{mask} \cdot DFT(Y)/X\} \quad (12)$$

This CCIR is then correlated in step 306 with a model complex channel impulse response mCIR defined on a higher resolution grid with a time step dt that is at least 2 times smaller than the sample time period $T_s$.

Turning back to FIG. 4, the exemplary OFDM receiver 200 in one embodiment thereof includes the TOP 170 for implementing step 304 generally described hereinabove. The TOP 170 is coupled to the RSE 206 via optional memory 214 for receiving the discrete baseband signal Y, and is further coupled to a modulation pattern memory (MPM) 165 and a model function memory (MFM) 160. The MPM 165 stores the modulation pattern X that was used at the transmitter 100 to generate the ranging CM signal 113 and, optionally, the 'mask' $P_{mask}$ that defines the set of subcarriers used for ranging. The MFM 160 stores a pre-determined model function that is a time-discrete function that is defined on a high-resolution time grid spaced by the time step $dt<T_s$. In one embodiment, this model function is a complex discrete function composed of complex values represented by two real values, such as I and Q values, amplitude and phase values, or alike.

Figure 6:
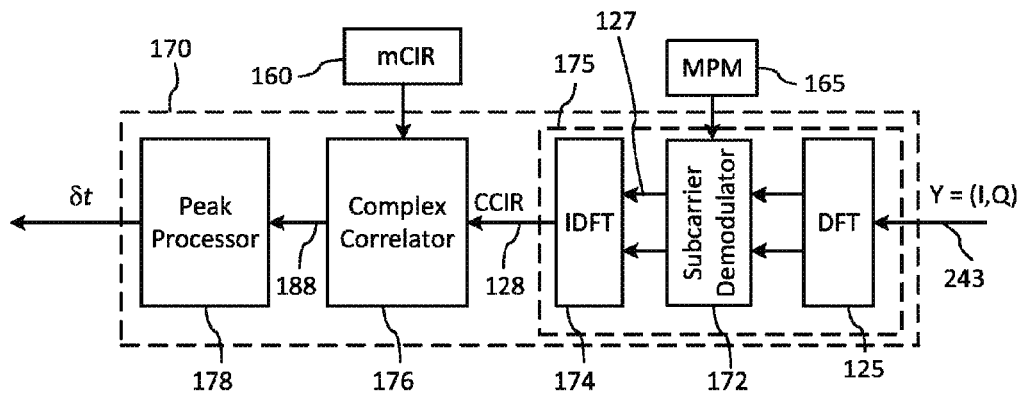
FIG. 6 is a schematic block diagram of a receiver timing offset processor (TOP) for determining the receiver timing offset.

Referring now to FIG. 6, there is illustrated a block diagram of the TOP 170 according to an embodiment of the invention. It includes a channel estimator 175 at its input, which at its output connects to a complex correlator 176 that is operatively followed by a peak processor 178. In the shown embodiment, the channel estimator 175 is formed of a DFT processor 125 that is followed by a subcarrier demodulator 172 that is in turn followed by an IDFT processor 174. The subcarrier demodulator 172 is coupled to the MPM 165. The channel estimator 175, complex correlator 176 and peak processor 178 may be embodied as software or firmware modules define within a single hardware processor or multiple hardware processors, or using dedicated hardware logic.

In operation, the channel estimator 175 generates a time-domain complex channel impulse response function (CCIR) 128 from the discrete CM signal Y, by keeping only the subcarriers used for ranging and removing therefrom the known subcarrier modulation 103 applied at the transmitter by using function X. The term 'complex' is used herein to mean a function that accounts for amplitude and phase information, or I and Q components in the complex plane. In exemplary embodiments described herein, CCIR 128 may be in the form of two sequences, or arrays, of real values I(n), Q(n), or the amplitude and phase values, and is defined on the sampling time grid spaced by the sampling time period $T_s$.

The channel estimator 175 operates, for example, as follows. First, the discrete CM signal Y in the form of two quadrature sequences of signal samples I(n) and Q(n) of length N is provided to the DFT processor 125, which performs DFT processing of length N thereon, and outputs complex subcarrier coefficients C(k), k=1, . . . , N, for a plurality of subcarriers. If N can be expressed as 2n where 'n' is an integer, an FFT algorithm can be used in the embodiment of the channel estimator. Each of the complex subcarrier coefficients is represented by the two quadrature components I(k)=Re(C(k)) and Q(k)=Im(C(k)), or the subcarrier amplitude and phase coefficients a(k) and $\Phi(k)$, wherein C(k)=a(k) exp[j·$\Phi(k)$].

In one embodiment, the DFT processing of the discrete CM signal Y is performed by the DFT processor 218 of receiver 200; the complex subcarrier coefficients C(k) generated by the DFT processor 218 are then passed to the optional memory 214 for storing therein as indicated by a dash line 229 in FIG. 4, and provided to the TOP 170 for further processing as described hereinabove. In this embodiment, an input DFT processor 125 shown in FIG. 6 may be omitted or bypassed. In one embodiment, the DFT blocks 125 and 218 are implemented as a single DFT processor.

The complex subcarrier coefficients C(k) are passed to the subcarrier demodulator 172 for removing therefrom the ranging modulation pattern X that is obtained from the MPM 165 and bringing the amplitude of the unused subcarriers to zero with the 'mask' $P_{mask}$. The output Z 127 of the subcarrier demodulator 172 can be described by equation (13):

$$Z=P_{mask} \cdot DFT(Y)/X. \tag{13}$$

Here, Z represents a sequence of complex subcarrier coefficients wherein the effect of the ranging modulation pattern is removed, the division represents element-by-element division, and $P_{mask}$ is the optional subcarrier mask factor that relates to embodiments wherein only a subset of all subcarriers is used for ranging. In such embodiments, $P_{mask}$ may be a real-valued sequence, or vector, where only the elements corresponding to the subcarriers used for ranging have non-zero values, for example 1. In equation (13), elements of 'X' that corresponds to subcarriers not used for ranging may be set to '1' to avoid the division by '0' if the values for unused subcarriers were set to ''0'.

The output 127 of the subcarrier demodulator 172 is then provided to the IDFT processor 174 for converting thereof into the time domain to obtain the CCIR 128, according to the following equation (14):

$$CCIR=IDFT(Z)=IDFT\{P_{mask} \cdot DFT(Y)/X\} \tag{14}$$

In embodiments wherein all the elements of the 'mask' vector $P_{mask}$ corresponding to active subcarriers in normal OFDM signals are equal to '1', i.e. the set of ranging subcarriers includes all active subcarriers of the OFDM signal generated by the transmitter 100, the CCIR 128 corresponds to the conventional discrete complex channel impulse response function that is used in many OFDM receivers for channel equalization, such as in the 'internal' channel estimator 222 of the OFDM receiver 200.

The discrete CCIR 128 is provided to the complex correlator 176, which processes it to obtain a time-domain high-resolution discrete channel function 188 that is defined on the second, high-resolution, time grid with a spacing equal to the time step dt. The term 'high resolution' is used herein to refer to discrete time functions or sequences of values wherein consecutive values are spaced in time by at most half of the sampling period $T_s$, and preferably spaced by less than 0.1 of $T_s$.

In one embodiment, the high-resolution model channel function that is stored in the MFM 160 represents a discrete high-resolution complex impulse response of an ideal communication channel between the transmitter 100 and the receiver 200, and is denoted as mCIR. The high-resolution mCIR may be obtained as follows.

In one embodiment, a discrete OFDM channel response $h_0(n)$ of an ideal channel, which is termed hereinbelow as the ideal-channel CCIR or iCIR, is first generated for a selected transmitter-receiver pair, or for 'standard' transmitter and receiver. For example, this can be done in a lab environment for a given transmitter-receiver pair using the following process: a) placing the transmitter and receiver back-to-back, connected through a wideband coaxial cable in an environment ensuring absence of any non-linearity and absence of any RF channel linear distortion such as propagation echoes, frequency attenuation, group delay, etc.; b) generating at the transmitter an OFDM signal including an OFDM ranging symbol 'S' composed of subcarriers modulated with the subcarrier modulation pattern X or other suitable modulation pattern, or generally by coherently multiplexing a selected set of suitably modulated subcarriers; c) transforming this signal into a signal suitable for transmission over the communication channel, such as an RF OFDM signal, using the transmitter's circuitry that may include DAC, frequency up-converter, power amplifier, antenna, etc; d) operating the receiver to receive the OFDM signal over the coaxial cable, synchronize to it in frequency and time according to its internal synchronization strategy; transforming the received OFDM ranging symbol S into the sampled ranging CM signal Y at 243 in FIG. 4; e) computing the complex channel impulse response (CCIR) 128 from the channel estimator process 175 described in FIG. 6 and recording this complex CCIR vector as iCIR $h_0(n)$.

Theoretically, the above process may be repeated a number of times for different delays between the transmitter 100 and the receiver 200, for example using coaxial cables of different lengths. First, the coaxial cable length corresponding to the sampling time $T_s$ would need to be established by considering the signal propagation speed in the cable which is very close to the speed of light. Determination of such speed can be accomplished according to prior art. Then, the ratio of the higher resolution time grid dt to the coarse grid $T_s$ needs to be decided (at least $T_s > 2$ dt). It is convenient to select the high-resolution time step dt in a harmonic relationship with the sampling period $T_s$. Once this ratio is determined, say $T_s/dt=l$, where l is an integer greater than 1, then the above process may be repeated with each time reducing the coaxial cable length by the propagation distance in the cable corresponding to dt. A set of l complex vectors $h_i(n)|_{i=0,l-1}$ would then be generated.

The resulting set of ideal-channel CCIR $h_i(n)$ is a family of l complex vectors of length N defined on the normal sampling time grid spaced by the sampling interval $T_s$ and representing the complex channel impulse response of the system, each time-shifted by the time interval dt on the higher resolution time grid. These vectors can then be combined together by interspersing their elements in accordance with equation (15) hereinbelow, to yield a high-resolution impulse response function mCIR for the ideal channel, which is defined on the high-resolution time grid spaced with the time step dt. Elements of the mCIR are defined according to equation (15):

$$mCIR(l \cdot n+i)=h_i(n) \tag{15}$$

Figure 7:
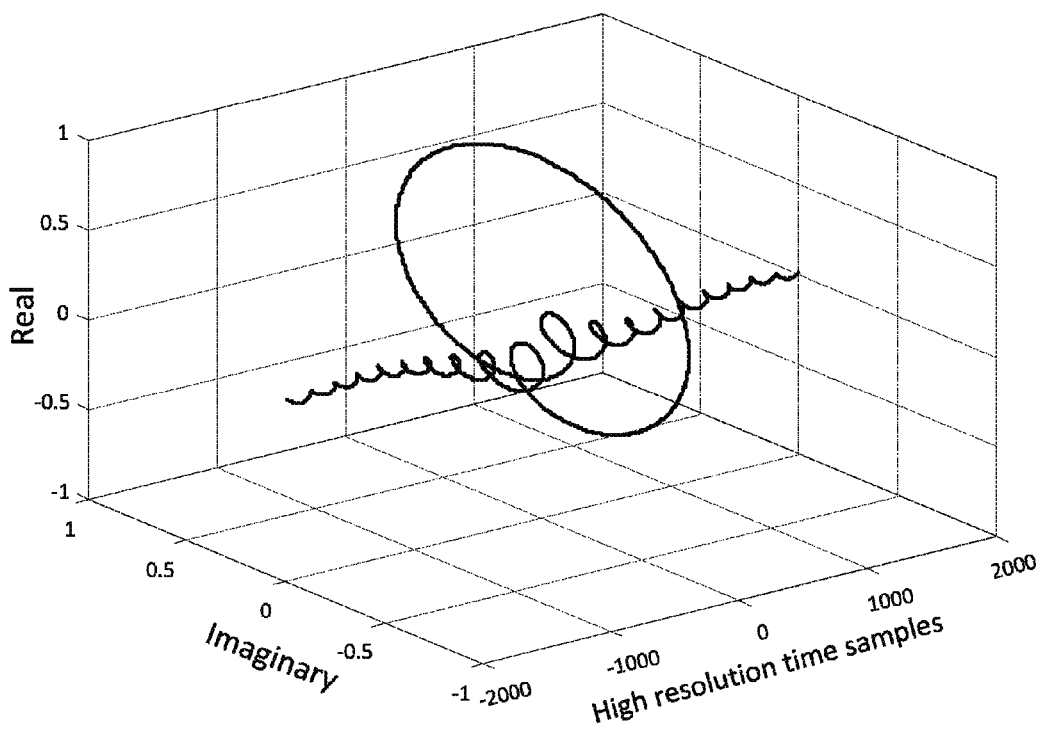
FIG. 7 is a 3D graph illustrating an exemplary high-resolution complex model function used by the TOP of FIG. 6 for determining the receiver timing offset.
Figure 8:
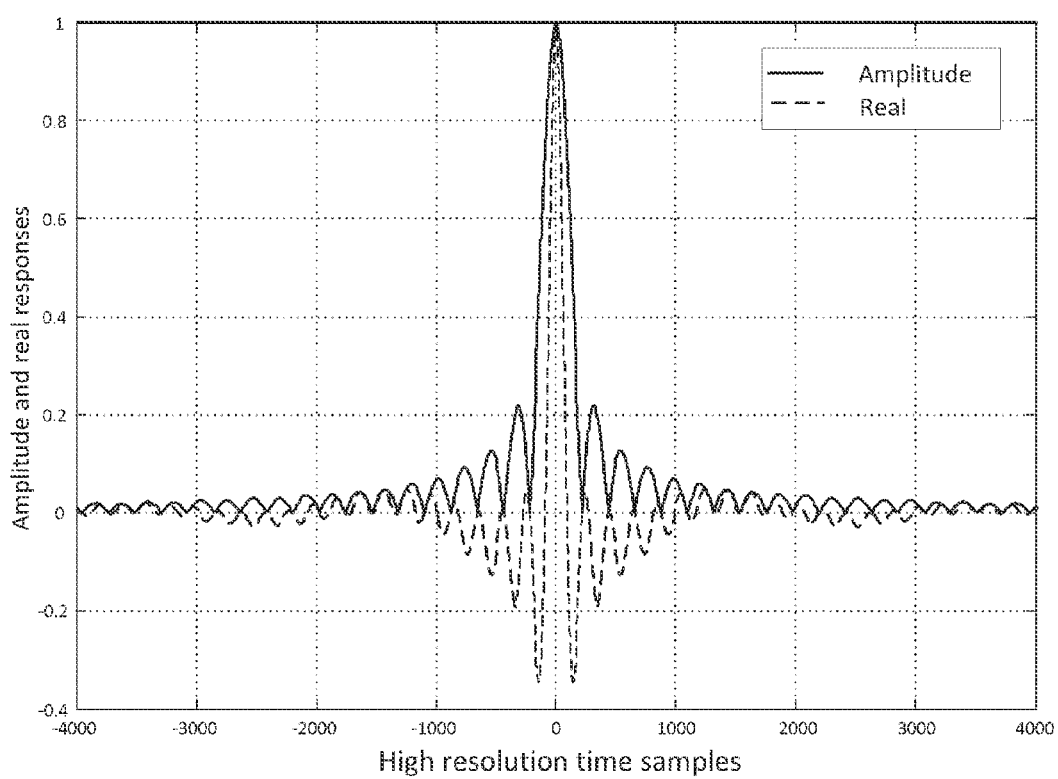
FIG. 8 is a graph showing the amplitude and real components of the exemplary high-resolution complex model function shown in FIG. 7.

The high-resolution impulse response function mCIR is a complex discrete function, or a sequence of complex values, and can be presented as two real-valued discrete functions. FIG. 7 illustrates one example of this function plotted in a complex 3D space in coordinates (n, 'Real', 'Imaginary') where 'Real' and 'Imaginary' stand for the real and imaginary parts of mCIR(n), i.e. Re{ } and Im{ } respectively, n indicating a time sample of the high-resolution time grid with the time spacing $dt=T_s/180$ in this example, which for $T_s=146$ µs corresponds to dt=0.8 ns. FIG. 8 illustrates the amplitude and the real components of the mCIR of FIG. 7. Note that the main peak in FIG. 8 has a −3 dB width that is defined by the bandwidth of the ranging OFDM signal 113 that was used in the construction of the ideal-channel impulse response function mCIR, and is on the order of 100% and 50% of the sampling time period $T_s$ for the amplitude and real responses respectively.

A simpler method of building the high-resolution impulse response function mCIR is by acquiring the iCIR $h_0(n)$ as described above for one coaxial cable length in the lab and using an analytical means to step the function over the high-resolution time shifts. Each time-shifted iCIR sequence $h_i(n)$ can be determined from the original ideal-channel iCIR $h_0(n)$ by incrementing the phase of each subcarrier in the iCIR spectrum in proportion to the relative subcarrier frequency multiplied by the time shift value i·dt, which results in a progressive rotation in a complex space of the subcarriers belonging to the iCIR as a function of increasing subcarrier frequency. Mathematically, the time-shifted iCIR sequence $h_i(n)$ can be computed based on the following equations (16a) to (16c):

$$h_i(n)=IDFT(H_i(k)) \tag{16a}$$

wherein $$H_i(k)|_{i=0,l-1}=H_0(k) \cdot e^{-j \cdot k \cdot i \cdot dt}|_{i=0,l-1}, \tag{16b}$$

$$H_0(k)=DFT(h_0(n)), \tag{16c}$$

where equations (16a) to (16c) include the complex value corresponding to all active subcarriers in the ranging signal, as indicated by the subcarrier index 'k'.

These complex vectors $h_i(n)_{i=1,l-1}$ can then be combined together as described above to form the high-resolution impulse response function mCIR.

Additionally, the process of building the high-resolution impulse response function mCIR can be further simplified if the ideal channel CIR, iCIR, can be expressed analytically. For example, if the iCIR corresponds simply to a masking of the subcarriers that are not used for ranging while changes in the amplitude and phase of the active subcarriers by the transmission system are disregarded, then the iCIR function can then simply be expressed as:

$$h_0(n)=IDFT\{P_{mask} \cdot Dirac_{freq}\} \tag{17}$$

where '$Dirac_{freq}$' is a complex frequency-domain vector from which all N elements have an amplitude of 1 and a phase of 0. The high-resolution impulse response function mCIR can then be built from this iCIR $h_0(n)$ by the analytical method of rotation of the phase of the carriers according to the delay steps as explained above.

The high-resolution model function mCIR is then provided to the complex correlator 176, which utilizes this function to obtain a high-resolution discrete channel function $h_{corr}(t)$ 188 from the CCIR 128. The high-resolution discrete channel function $h_{corr}(t)$ is also referred to herein as the channel echo function (CEF), and is defined on the high-resolution time grid spaced with dt.

In one embodiment, the CEF $h_{corr}(t)$ is a function that the complex correlator 176 computes by cross-correlating the CCIR 128 with the complex mCIR. Mathematically, the operation of the complex correlator 176 may be described as a cross-correlation or sliding dot product of the two functions CCIR and mCIR to identify at what time-sliding instant, on the high-resolution grid spaced by the time interval dt, the complex values on the low-resolution grid of the CCIR vector 128 are most similar to the corresponding complex values on the high-resolution mCIR function. Note that this mCIR contains the complex values representing the ranging signal that has passed through the transmission system and for which the received signal has been delayed by a multiplicity of dt increments on the high-resolution time grid. This cross-correlation therefore gives a measure of the similarity between the CCIR 128 obtained from the received signal and the response of the transmitter-receiver system to an unimpaired channel defined for every step of the high-resolution time grid. Mathematically, the computation of CEF may be described using the following equation (18):

$$CEF \equiv h_{corr}[n] \equiv (CCIR * mCIR)[n] = \sum_{k=0}^{N-1} CCIR^*(k)mCIR(lk+n), \tag{18}$$

where n represents the sliding time between the two functions defined on the high-resolution time grid spaced by dt and CCIR* represents the complex conjugate of the CCIR function 128. In one embodiment, a real part of the summation in the right hand side of equation (18) is taken to represent the CEF.

The real valued component of the function $h_{corr}(n)$ obtained by equation (18) contains one or more peaks corresponding to the echoes of the ranging OFDM signal 113 that are received by the receiver 200, with locations of these peaks corresponding to the different times of arrival of these echoes at the receiver 200 on the high-resolution time grid. These peaks represent different receiver timing offset values corresponding to the various propagation paths in the communication channel. In creating the CEF, the complex correlator 176 exploits similarities between the mCIR and CCIR 128 in everything but the properties of the communication channel, to determine a likelihood that the channel creates an echo at each particular value of the time parameter t=n·dt which is stepped over the high resolution grid. This process may generate a relatively long CEF vector of up to 2·1·N elements; however since, for precise ranging purposes, only the first echoes are of interest, this vector can be truncated to a large extent.

Figure 9:
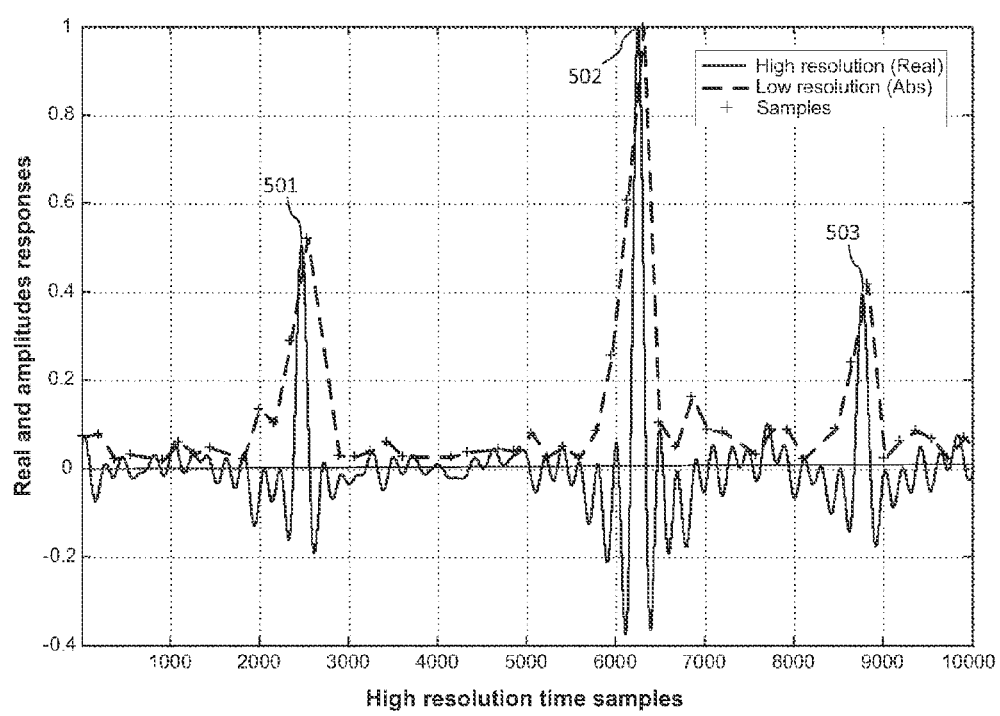
FIG. 9 is a graph showing an exemplary high-resolution channel echo function determined according to an embodiment of the present invention in comparison with the amplitude of the discrete CIR measured at the receiver.

Advantageously, the echo peaks in CEF may be much narrower than corresponding echo peaks in the CCIR 128, thereby enabling determining their exact location along a time axis with a high resolution that is much smaller than the sampling time $T_s$. This is illustrated in FIG. 9, wherein an exemplary CEF 188 is shown, by a solid curve, in comparison with amplitude values of the corresponding samples in the CCIR 128, marked with '+' symbols, from which the CEF 188 was computed. Clearly, the CEF exhibits narrower peaks which are over-sampled, and which provide more accurate echo delay values. These peaks may be surrounded by local maxima, or, sidelobes, which are typically of a lower height and which do not directly relate to any particular propagation path and thus should be ignored.

Referring back to FIG. 6, the CEF 188 is provided to a peak processor 178, for determining a location of at least one peak therein.

In the presence of multi-path, the CEF 188 may exhibit multiple peaks, such as peaks 501, 502 and 503 in FIG. 9, which correspond to different echo delays in the communication channel. The location of a first peak in the direction of increasing time parameter t, such as the peak 501, corresponds to the shortest path between the transmitter 100 and the receiver 200, which is likely to be a direct path therebetween. Accordingly, in one embodiment of the invention the peak processor 178 is programmed to identify the location of the first peak 501 in the CEF 188, and to compute the timing offset δt 58 therefrom. This timing offset value is then output for further processing, such as to compute a corrected ToA value as described hereinabove.

In one embodiment, the peak processor may sweep the CEF 188, which may be defined over up to 2·1·N high resolution samples n, or a first portion thereof, and identify the first peak on the left, i.e., with the least delay n, that meets a pre-defined minimum amplitude criterion, e.g., amplitude >10% of the maximum echo found in the entire CEF. Additional processing may also be included to correct for the amplitude and delay of this echo resulting from a smearing of the CEF, which will affect the amplitude and delay of close-by echoes due to the limited channel bandwidth. Since, for a given channel bandwidth and given relative amplitude and delay of nearby echoes, this effect is deterministic, at least for specular echoes, such correction can be applied a posteriori to improve the echo timing accuracy. The location of the first, lowest-delay peak in the CEF may then be used to compute the receiver timing offset δt on the high-resolution grid that is defined with dt steps. In the event where the first peak is of a lower height than one or more larger excess delay peaks and is close in height to the background sidelobes and/or the 'noise' level in the CEF, additional processing may help in the identification and locating thereof. In one embodiment, once an echo peak is identified with its precise delay and amplitude by the peak processor 178, the corresponding values from the mCIR function, spaced every $T_s$ and adjusted with the proper delay and amplitude, are subtracted from the CCIR 128 to form a new CCIR, which is then re-applied to the input of the complex correlator 176, giving a new channel echo function where this echo peak and its surrounding sidelobes no longer appear, or at least are significantly suppressed. This process can be repeated iteratively for each peak in a decreasing order of peak amplitude. Since this iterative process eliminates or reduces the sidelobes that usually accompany these peaks, due to channel bandwidth limitation, among other things, this reduces the probability of identifying false echoes.

Other embodiments may utilize different approaches to extract the channel multipath echo locations from the CCIR 128 and produce the results on a high-resolution time axis. For example, the relative subcarrier phases of the received ranging signal Y 243, once it has been converted to the frequency domain and its subcarriers have been corrected by removal of the original modulating sequence X, i.e. see the de-modulated frequency-domain signal 127 in FIG. 6, contain information that can lead to precise determination of the channel multipath echoes amplitude and location. This can be done, as seen above, through applying a IDFT and a peak detection scheme. It can also be done through estimating the linear slope of the subcarriers phase as a function of frequency by properly unwrapping the hidden 360 deg. phase rotations. The resulting slope is representative of the echo delay and can be quantified using a time step $dt<T_s$ on the high-resolution time grid. In these cases, e.g., the IDFT and linear slope estimation methods, better accuracy can be achieved by using an iterative process whereby the largest amplitude echo, once localized, is removed from the frequency domain corrected Y 243 signal and the process is repeated to find the amplitude and time location of the second echo, and so on.

Although it was found that the exact timing of the echo peaks 501, 502 and 503 in the CEF depends mainly on the relative subcarrier phase information and is relatively insensitive to subcarrier amplitudes, the relative amplitude of these echoes is related to the amplitude of the subcarriers. If finding the time location of the echoes is sufficient to locate the first echo representing the direct signal path for distance calculation, it may not be necessary to preserve the subcarrier amplitude information in the computation of CCIR 128. However, in some embodiments, such subcarrier amplitude information may facilitate identification of the first echo that meets the minimum relative amplitude criterion while avoiding erroneous "first peak" detection.

Referring again to FIG. 6, in one embodiment, the TOP 170 is incorporated within the receiver 200 or co-located therewith, and the values of the $T_r$ and δt are used to generate the corrected ToA value using an adder. In one embodiment, the values of $T_r$ and δt, either separately or added together, are provided to a ranging processor to determine the transmitter-receiver distance d. In one embodiment, the ranging processor is remote from the receiver 200, and the values of $T_r$ and δt are transmitted thereto by a transmitter that is co-located with the receiver 200.

The OFDM processing blocks 216, 218, 220, 224 and 222 are not required for determining the receiver timing offset and may be absent in some embodiments. In one such embodiment, receiver 200 may be a non-OFDM receiver that is adopted for identifying an OFDM ranging signal 113, to obtain the discrete CM signal Y corresponding thereto, and to transmit said signal Y, or a signal obtained therefrom and containing subcarrier amplitude and phase information, to the TOP 170, which may be co-located with the receiver 200 or remote therefrom.

In embodiments wherein the receiver 200 is an OFDM receiver that incorporates the DFT block 218 and the channel estimator 222, these blocks can be utilized to perform the functions of the blocks 125 and 172 to compute the CCIR 128, which can then be communicated to a remote processor for computing the CER 188 and the timing offset 58.

Figure 10:
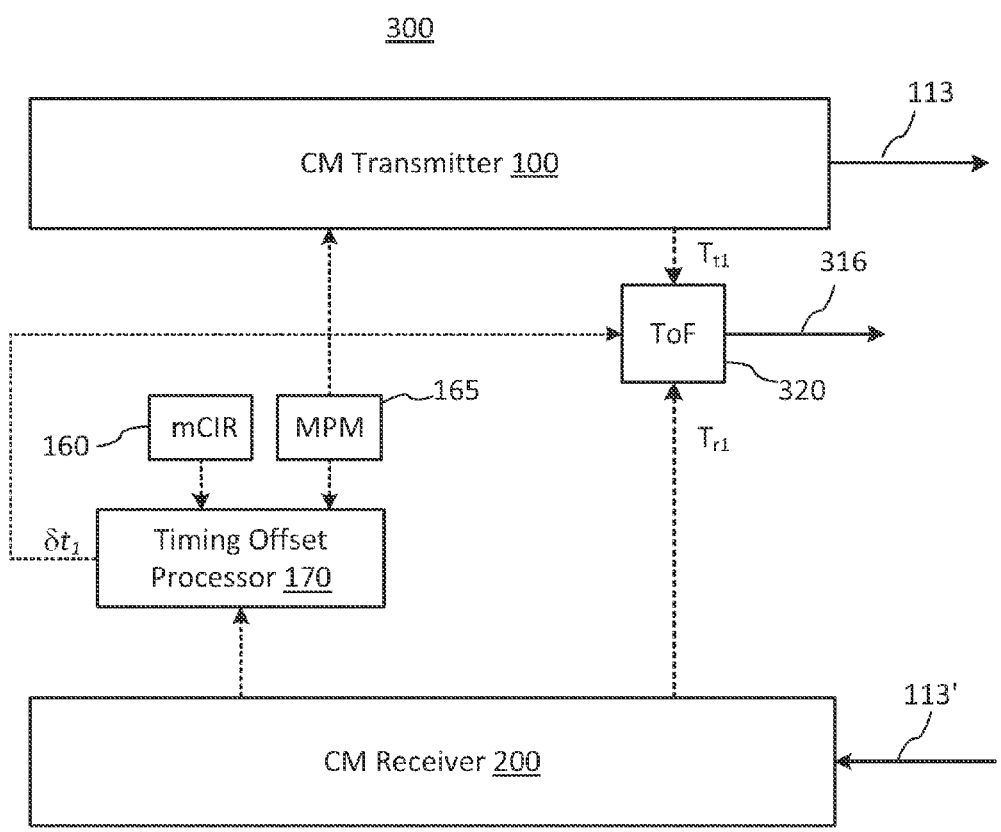
FIG. 10 is a schematic block diagram of a multicarrier transceiver including a timing offset processor for determining the distance to the object in the embodiment of FIG. 1A.

Referring now to FIG. 10, there is illustrated an exemplary communication device 300 in the form of a transceiver which can be used in the M-Radar configuration as described hereinabove. The transceiver incorporates the receiver 200, the TOP 170 coupled thereto, the OFDM transmitter 100, and a ToF computer 320, which can be embodied as an algebraic adder to perform the computation in accordance with equation (2) for determining the time of flight value and/or the distance traveled by the ranging OFDM signal 113. Note that the received signal 113' is likely to be somewhat different from the transmitted signal 113 since it may be distorted by the channel (e.g., including echoes).

Figure 11:
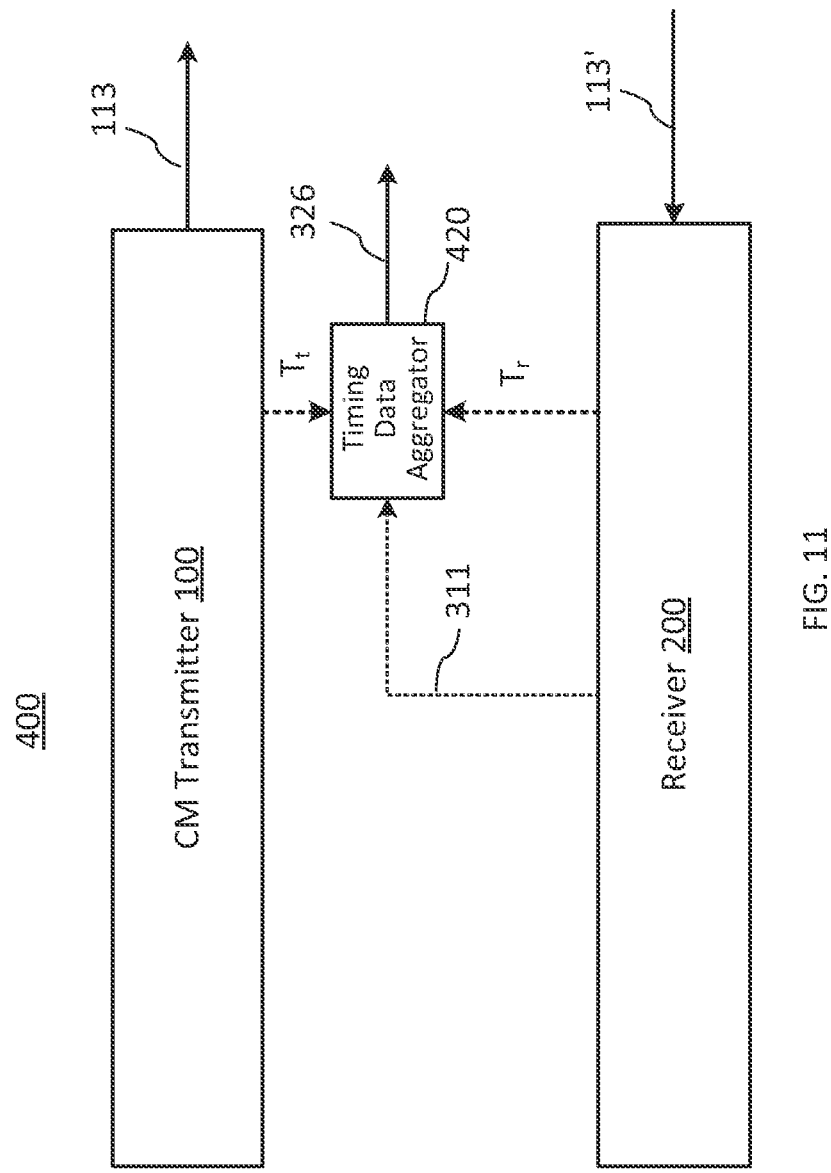
FIG. 11 is a schematic block diagram of a multicarrier transceiver adopted to transmit timing data to a remote ranging processor.

Referring now to FIG. 11, there is illustrated an exemplary communication device in the form of a transceiver 400 that can be used in ranging or M-radar application in accordance with an embodiment of the present invention. The transceiver 400 lacks full capabilities of the TOP 170; instead of computing the receiver timing offset 155 as shown in FIG. 4, which is labeled '58' in FIG. 3, the transceiver 400 includes a timing data aggregator 420 that aggregates the $T_r$ and $T_t$ values, and a channel vector 311 representative of the ranging CM signal Y received by the receiver 200, in a timing data signal 326 for communicating to a remote ranging processor. Note that the term 'vector' is generally used herein to mean a sequence of real or complex values. The channel vector 311 is a discrete signal generated by the receiver 200 from the received ranging signal 113', and can be in the form of the time-domain baseband discrete CM signal Y, a set C of complex subcarrier coefficients computed from the ranging symbol by performing the DFT of Y, the frequency-domain CCIR 127 from which the subcarrier modulation by the original PNS, stored in 200, has been removed, or the time-domain CCIR 128, once the IDFT has been applied to 127 such as that defined by equation (12). The timing data signal 326 may be multiplexed with the OFDM signal 113 for transmitting to the remote ranging processor, or may be communicated thereto using an alternative communication channel.

Figure 12:
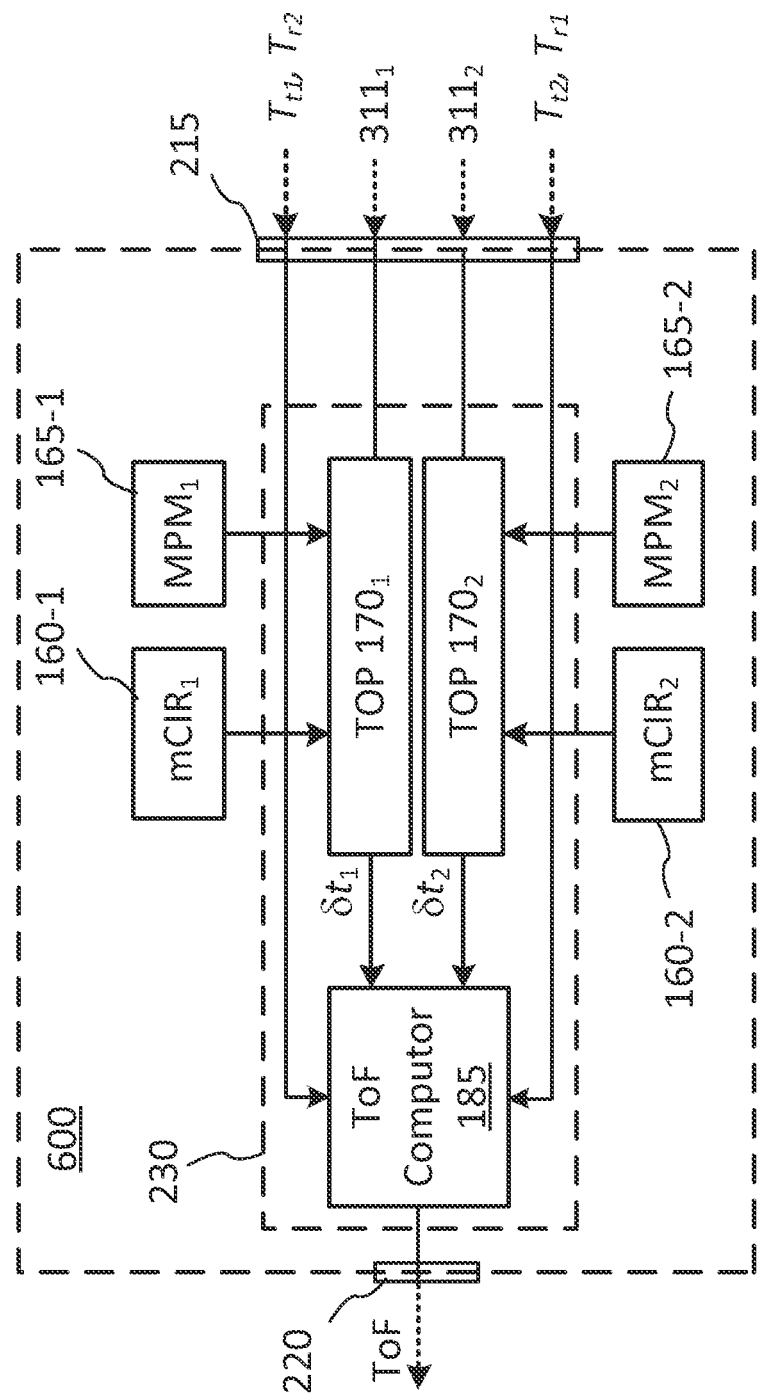
FIG. 12 is a schematic block diagram of a ranging processor for determining ToF information between two transceivers based on timing data provided by the transceivers.

Referring now to FIG. 12, there is illustrated a ranging processor 600 for computing a ToF or the distance d between two transceivers, such as the transceivers 10 and 20 illustrated in FIG. 1B or 1C. The ranging processor 600 includes an input port 215 for receiving the coarse timing information, for example in the form of $T_r$ and $T_t$ values $T_{r1}$, $T_{r2}$, $T_{t1}$, $T_{t2}$, and the channel vectors $311_1$ and $311_2$ from the two transceivers participating in ranging, wherein '1' in the subscript refers to a first of the two transceivers, and '2' refers to the second of the two transceivers. The input port 215 may be coupled to, or incorporate, a wireless or wireline receiver for receiving, from the two transceivers engaged in ranging, two timing data signals 326 carrying the $T_r$ and $T_t$ values $T_{r1}$, $T_{r2}$, $T_{t1}$, $T_{t2}$, and the channel vectors $311_1$ and $311_2$. In one embodiment, the input port 215 is in the form of, or incorporates, a network card. FIG. 12 shows an embodiment wherein two versions of TOP 170 of FIG. 6, TOP $170_1$ and TOP $170_2$ are provided for parallel processing of the channel vectors $311_1$ and $311_2$. In one embodiment the parallel combination of TOP $170_1$ and TOP $170_2$ is implemented using a single TOP 170 for sequentially processing the channel vectors $311_1$ and $311_2$.

In one embodiment, the channel vector $311_1$ or $311_2$ is in the form of the time-domain discrete signal Y, and the respective TOP $170_1$ and/or $170_2$ is as shown in FIG. 6. Memory blocks 165-1 and 165-2 store modulation patterns $X_1$ and $X_2$ that were used to generate the first and second ranging signals at respective transceivers. They are used in the TOP $170_1$ and TOP $170_2$, respectively, for computing corresponding CCIR functions for the first and second received ranging signals, as described hereinabove with reference to FIG. 6. If a same SMP 'X' is used for generating the first and second ranging signals, a single MPM 165 is sufficient. Memory blocks 160-1 and 160-2 store corresponding high-resolution model functions $mCIR_1$ and $mCIR_2$ for the upstream and downstream ranging signals, i.e. for the transmission from, e.g., the first transceiver 10 to the second transceiver 20, and for the transmission from the second transceiver 20 to the first transceiver 10. In embodiments wherein the high-resolution model function mCIR is the same for upstream and downstream, i.e., $mCIR=mCIR_1=mCIR_2$ for the timing offset processing in both propagation directions, a single mCIR memory block 160-1 or 160-2 is sufficient.

In other embodiments, the channel vector $311_1$ or $311_2$ can be obtained from the output of any of the blocks 125, 172, and 174 shown in FIG. 6 when the corresponding blocks are located in the receiver; in such embodiments, the corresponding block in the respective TOP $170_1$ or $170_2$, and blocks preceding thereto, are omitted.

For example, in one embodiment, the channel vectors $311_1$ or $311_2$ is in the form of the CCIR 128 obtained from the output of the channel estimator 175 in FIG. 6, and the respective TOP $170_1$ and or $170_2$ has the complex correlator processor 176 at the input thereof, omitting the channel estimator. MPM blocks 165-1, 2 are then absent.

In one embodiment, the ranging processor 600 is located remotely from the first and second transceivers exchanging the ranging signals, for example at the ranging server 25 illustrated in FIG. 1C. In another embodiment, the ranging processor 600 may be co-located with one of the transceivers participating in ranging, or incorporated therein.

Figure 13:
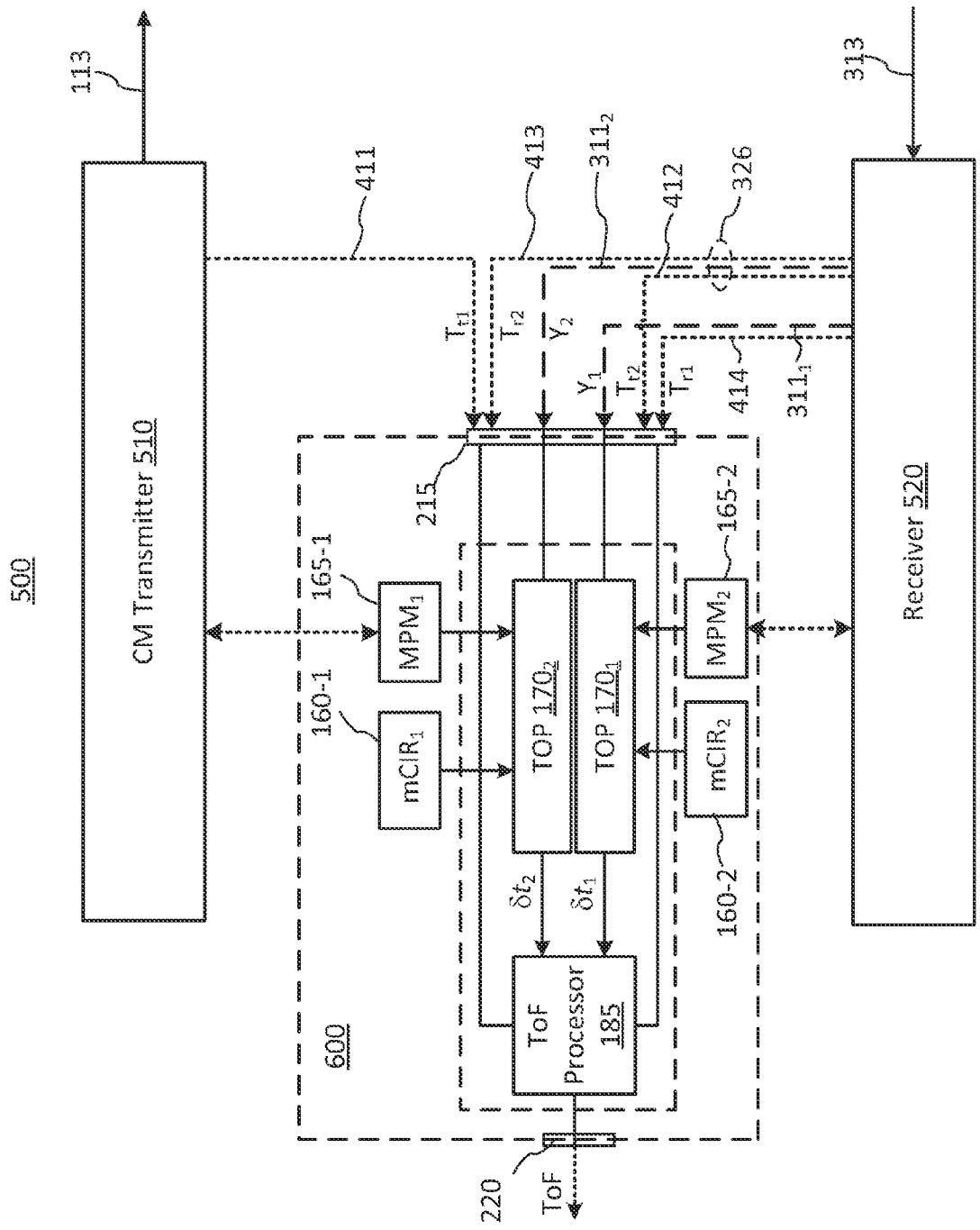
FIG. 13 is a schematic block diagram of a multicarrier transceiver including the ranging processor of FIG. 12.

Referring to FIG. 13, there is illustrated an exemplary communication device in the form of a transceiver 500 that incorporates the ranging processor 600, a CM transmitter 510 and a receiver 520. The CM transmitter 510 can be embodied as the CM transmitter 100 of FIG. 3, while the receiver 510 may be embodied as the receiver 200 of FIG. 4. The transceiver 500 may participate in a ranging process with the transceiver 400 of FIG. 11 which may be remote from the transceiver 500, generally as described hereinabove with reference to FIG. 1B. In the context of this ranging process, the transceiver 500 may be viewed as an embodiment of the transceiver 10 illustrated in FIG. 1B, while the transceiver 400 of FIG. 11 may be viewed as an embodiment of the transceiver 20. In operation, the transceiver 500 utilizes the transmitter 510 thereof to transmit a first ranging CM signal 113 to the transceiver 400 of FIG. 11, and utilizes the receiver 520 thereof to receive the second, or return, ranging CM signal 313 from the transceiver 400 of FIG. 11. The transmitter 510 records the first transmission start time $T_{t1}$ for the first ranging CM signal 113, and passes it to the input port of the ranging processor 600 as indicated by an arrow 411. The receiver 520 of the transceiver 500 receives from the transceiver 400 the second ranging signal 313, and the timing data signal 326 carrying the second sampling start time $T_{r2}$, that was obtained at the transceiver 400 for the first ranging CM signal 113, the second transmission start time $T_{t2}$ for the return ranging signal 313, and the channel vector $311_2$ that the transceiver 400 generated from the received first ranging CM signal 113, and passes it to the input port 215 of the processor 600. The second sampling start time $T_{r2}$, indicated by an arrow 413, is the sampling start time generated at the transceiver 400 when it receives the first ranging CM signal 113 as described hereinabove. The second transmission start time $T_{r2}$, indicated by an arrow 412, is the time indicating when the return ranging signal 313 leaves the transceiver 400. The channel vector $311_2$ is the channel vector generated by the transceiver 400 from the first ranging CM signal 113 by sampling thereof, such as in the form of the second sampled ranging signal $Y_2$ or in one of the other forms as described hereinabove. The receiver 520 processes the received ranging signal 313 to obtain the channel vector $311_1$ as described hereinabove, such as in the form of a sampled ranging signal $Y_1$ or in one of the other forms as described hereinabove, and passes it to the input port 215 of the ranging processor 600. The receiver 520 also records the sampling start time $T_{r1}$ for the received ranging CM signal, and passes it to the input port 215 of the ranging processor 600 as indicated by an arrow 414. The ranging processor 600 then processes the received timing data to generate the ToF value or the distance d value as described hereinabove with reference to FIG. 12 and FIG. 6. In another embodiment, the timing signal 326 carrying the timing values $T_{r2}$ and $T_{t2}$ and the channel vector $311_2$ generated at the remote transceiver 400 are communicated to processor 600 of the transceiver 500 using an alternative communication channel.

Figure 14:
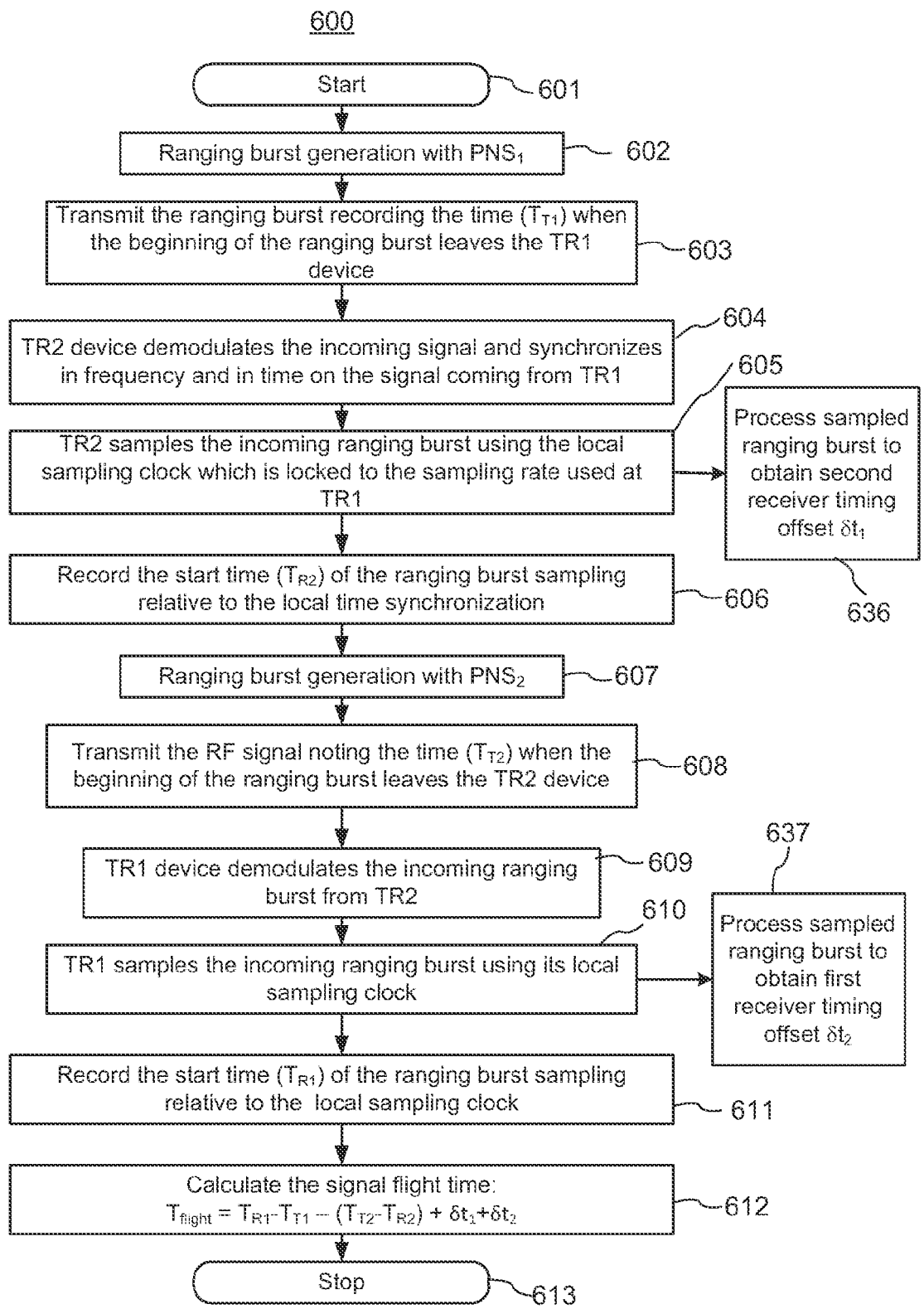
FIG. 14 is a flowchart illustrating the method of ranging according to an embodiment of the present invention.

FIG. 14 illustrates steps of the ranging process according to an embodiment of the present invention. In the flowchart, the term 'ranging burst' refers to a ranging CM signal as described hereinabove, 'TR1' and 'TR2' refer to the first and second transceivers 10 and 20, respectively, as indicated in FIGS. 1B to 1C.

The method starts at step 601, and proceeds to step 602 wherein the first ranging CM signal is generated at the first transceiver TR1 using a first pseudo-noise sequence PNS1 to modulate the subcarriers used by TR1 for ranging. In step 603, the ranging CM signal is transmitted by TR1 while the transmission start time $T_{t1}$ when the beginning of the ranging signal leaves the TR1 device, is recorded. In step 604, TR2 device demodulates the incoming first ranging signal and synchronizes in frequency and in time on the signal coming from TR1. In step 605, TR2 samples the incoming ranging signal using the local sampling clock which is locked in frequency to the sampling rate used at TR1, recording in step 606 the start time $T_{r2}$ of the ranging signal sampling relative to the local time synchronization. The sampled ranging signal $Y_2$ is sent to step 636, for processing thereof to obtain the first receiver timing offset $\delta t_1$. In step 607, the second ranging CM signal is generated at the second transceiver TR2 using a second pseudo-noise sequence $PNS_2$ to modulate the subcarriers used by TR2 for ranging. In step 608, the second ranging CM signal is transmitted by TR2 while the second transmission start time $T_{t2}$ when the beginning of the second ranging signal leaves the TR2 device is recorded. In step 609, TR1 device demodulates the incoming second ranging CM signal. In step 610, TR1 samples the incoming ranging signal using the local sampling clock which is the same as used by TR1 to transmit the first ranging signal. The sampled ranging signal $Y_1$ is sent to step 637, for processing thereof to obtain the first receiver timing offset $\delta t_2$. TR1 records in step 611 the start time $T_{r1}$ of the second ranging signal sampling relative to the local time synchronization. In step 612, the ToF is determined using, for example, equation (4).

Note that the sequence of steps 607-611 may precede the sequence of steps 602-606, as well as follow it or be performed concurrently as signaled by a ranging server. Steps 636 and 637 may be performed at any time after the completion of steps 605, 610. Step 612 may be performed at any time after the completion of steps 636 and 637.

Figure 15:
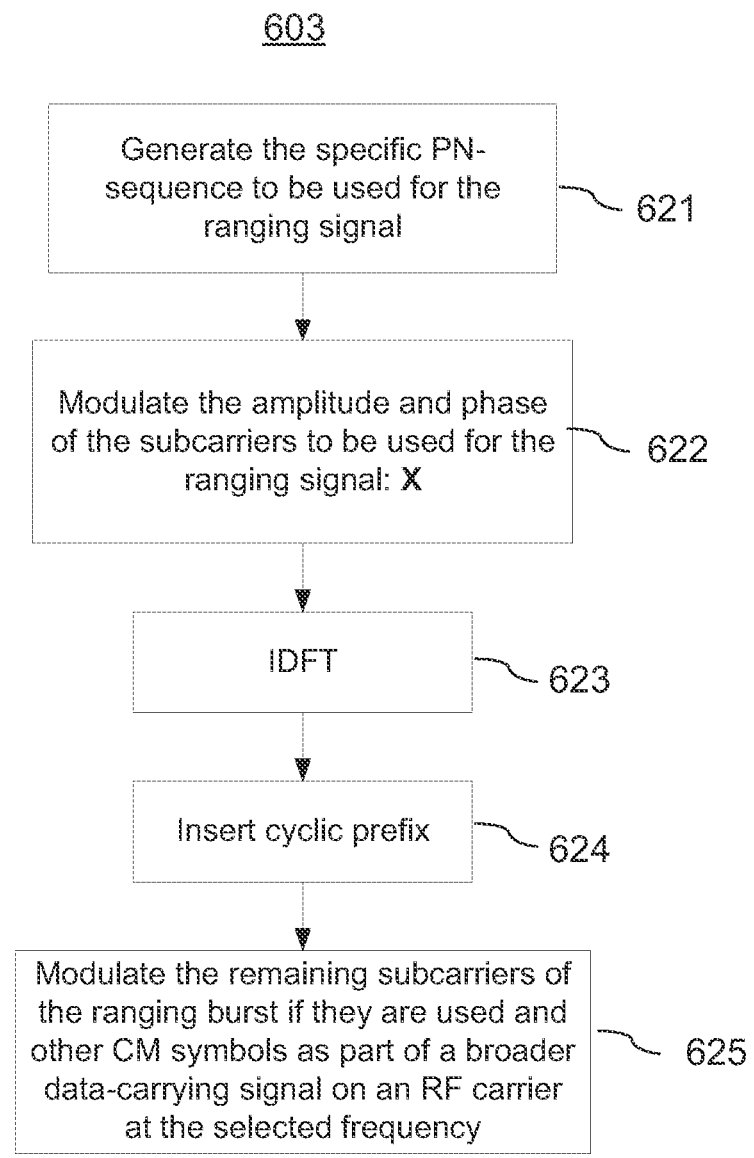
FIG. 15 is a flowchart illustrating a process of ranging signal generation in one embodiment of the method of FIG. 14.

FIG. 15 shows operations that may be performed in the generation of the ranging bursts in steps 603 and 608 of the process of FIG. 14 according to an embodiment of the invention. These operations are as follows. Step 621: generating the specific PN-sequence PNS1 or PNS2 to be used for modulating the ranging signal. Note that alternatively these PNS' may be pre-calculated and stored as is in a memory from where the PNS can be fetched. Step 622: modulating the amplitude and phase of the subcarriers to be used for the ranging signal with $PNS_1$ or $PNS_2$. Step 623: converting the plurality of modulated subcarriers to time domain using the IDFT. Step 624: inserting a cyclic prefix. Step 625: modulating the remaining subcarriers of the ranging burst if they are used and other CM symbols as part of a broader data-carrying signal on an RF carrier at the selected frequency.

Figure 16:
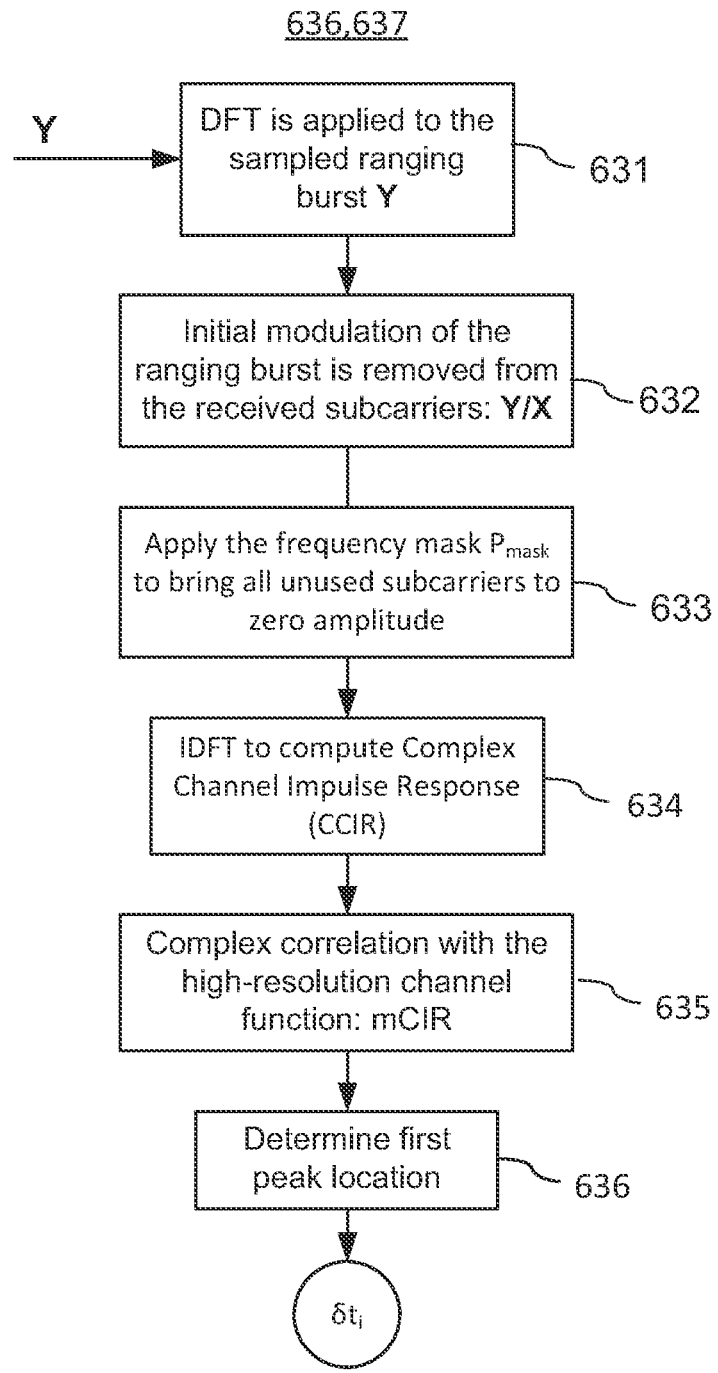
FIG. 16 is a flowchart illustrating a process of computing the receiver timing offsets in one embodiment of the method of FIG. 14.

FIG. 16 shows operations that may be performed to obtain the receiver timing offsets in steps 636 and 637 of the process of FIG. 14 according to an embodiment of the invention. These operations are as follows. Step 631: applying the DFT to the sampled ranging burst Y to obtain amplitudes and phases of the received ranging subcarriers. Step 632: removing the transmitter-imposed modulation of the ranging burst from the received subcarriers to obtain a plurality of 'equalized' ranging subcarriers. Step 633: applying the mask $P_{mask}$ that will bring all the subcarriers not used for ranging to zero amplitude. Step 634: converting the plurality of 'equalized' ranging subcarriers to time domain using the IDFT to obtain the. Step 635: CCIR is correlated with a high-resolution model function mCIR to obtain a high-resolution channel echo function (HRCEF). Step 635: the location of a first peak in the HRCEF, corresponding to a smallest time offset for all peaks present in the HRCEF, is determined, and is output as the corresponding first or second receiver timing offset $\delta t_1$ or $\delta t_2$.

In one embodiment, steps 631-635 are performed in a same transceiver TR1 or TR2 where the corresponding discrete CM signal $Y_1$ or $Y_2$ is received and sampled.

In one embodiment, at least one of the transceivers TR1 and TR2 sends the respective sampled ranging signal $Y_i$, i=1, 2, to a remote processor over a data channel, and the remote processor performs the steps 631-635 to determine the time offset of the ranging burst.

In one embodiment, at least one of the transceivers TR1 and TR2 performs the computations shown in FIG. 16 down to and including any of the boxes 631, 632, and 633, and sends the respective output to a remote processor over a data channel for performing all of the remaining steps in the sequence of steps shown in FIG. 16 to determine the time offset of the ranging burst.

By way of example, a possible implementation is given using the parameters of the IEEE P802.22 Standard. The ranging signal in the downstream uses the frame preamble OFDM symbol which is constituted of 840 subcarriers modulated by a PNS and using every other subcarrier of a 2k FFT subcarrier set constituted of 184 null negative frequency subcarriers, 420 of the 840 negative frequency active subcarriers, a null DC subcarrier, 420 of the 840 positive frequency active subcarriers and 183 null positive frequency subcarriers. The sampling frequency corresponds closely to 8/7 of the TV channel bandwidth of 6 MHz, that is 6.8574 MHz resulting in a sampling period $T_s$=145.83 µs and a subcarrier spacing of 3.3483 kHz. Note that the effective channel bandwidth is (840+1+840)*3.3483=5.629 MHz which fits on the 6 MHz TV channel. The useful portion of the OFDM symbol is 2048*$T_s$=298.7 µs long to which is appended a ¼ cyclic prefix which makes the entire OFDM symbol 373.3 µs long. Since the ranging signal uses every other subcarrier, the time span of the CCIR is therefore half an active symbol long, that is 149.4 μs, before aliasing would start to appear and the resolution is $T_s$=145.83 μs.

The upstream of this point-to-multipoint system uses OFDMA to share the capacity amongst many CPEs communicating with the BS. In order to limit the capacity required for the ranging burst in the upstream direction, the number of subcarriers used for ranging is reduced. For example, a regular pattern of 1 over 10 subcarriers could be used for the ranging burst which would result in a CCIR with a time span of 298.7/10=29.87 μs which is sufficient to quantify echo locations without aliasing in all but extreme multipath situations. This would result in 168 subcarriers, that is 1/10 of the upstream capacity. Further reduction can be achieved by limiting the frequency span of the ranging burst to ±1.5 MHz, thus using 84 subcarriers modulated by a known spread spectrum sequence, resulting in doubling the echo localization lobe width, that is 145.83 μs at −3 dB for the real representation of the lobe, reducing the resolution achievable by half compared to that achievable on the downstream. The upstream useful symbol can also be augmented with a ¼, ⅛, 1/16 or 1/32 cyclic prefix, to be chosen to avoid ISI depending on the local multipath environment.

The accuracy of flight time estimation with OFDM signals is limited by the accuracy with which the timing offset at the receiver can be determined, provided that the frequency of the receiver and transmitter clocks are well synchronized. Using conventional methods of ranging, the accuracy of the receiver timing offset was limited to about $+\backslash -T_s/2$, or about $+\backslash -73$ ns in this example, yielding the ranging accuracy of about $+\backslash -22$ m or worse. The method of present invention enables to determine the timing offset with time resolution defined by the number $l=T_s/dt$ of high-resolution time samples in one sampling interval $T_s$, and is about $dt/2=T_s/2l$. By selecting/to be suitably large, the ultimate accuracy of ranging can be improved to a target level desired for a particular application. For example, by selecting $l=180$, which corresponds to the high-resolution time step $dt \approx 0.81$ ns for $T_s$ according to the IEEE P802.22 Standard, the timing offsets can be determined with an ultimate accuracy of $+\backslash -dt/2=0.4$ ns, thereby providing an ultimate accuracy of ranging in sub-meter range, provided that the receiver and transmitter participating in ranging are able to maintain their clock synchronization within a nanosecond during the ranging process, and provided that various delays in the receiver and transmitter circuitry are well characterized with a sub-nanosecond or nanosecond level accuracy. In practical embodiments, the rate of oversampling related to the parameter l may be reduced while keeping the accuracy of the location of the resulting CEF maxima by using a curve fitting process on the available CEF data points. Assuming, for example, a parabolic or Gaussian shape for the lobes resulting from echoes in the CEF and applying well known curve fitting methods will allow the localization of the maxima with higher accuracy than that available from the above oversampling process.

Methods of ranging and geolocation described hereinabove with reference to specific embodiments can be used for any system that can transmit a multicarrier signal as a probing signal, sample this signal at a frequency synchronized receiver and send this received sampled signal as well as the value of the timers for the signal reception and transmission to a remote processor to allow for the signal processing described in FIG. 16; the system does not have to be a communication system in other aspects of its operation, and/or may not be using multicarrier signals in its operation otherwise than for ranging.

Advantageously, the present invention enables determining the receiver timing offset with time resolution and accuracy much higher, for example by a factor of 100 or greater, than the time resolution corresponding to either the inverse of the signal bandwidth or the receiver sampling period. Accordingly, the present invention makes it possible to use relatively low-bandwidth signals for highly accurate distance and time-of-flight measurements.

Furthermore, the ability to determine with high accuracy the exact time of arrival of a signal at a receiver that is provided by the present invention enables using wireless CM signals and digital receivers for radar-type applications, i.e., when measuring a distance to a reflecting object, or in ranging between wireless transceivers, such as, but not limited to, those used in wireless communication networks. The approaches described hereinabove can also be applied to optical signals, and to both wireless and wireline propagation.

Furthermore, although exemplary embodiments of the invention described hereinabove utilize a single RF receiver and a single RF transmitter at each transceiver, other embodiments may utilize multiple RF receivers and/or multiple RF transmitters at a single location, such as in Multi-Input Multi-Output (MIMO) devices known in the art. In these embodiments, multiple timers 116 may be used, along with the multiple receiver timing offset calculations, allowing for multiple concurrent ranging to take place to estimate the direction of arrival of each of the received ranging CM signal components.

The use of pseudo-noise sequences to modulate the subcarriers of the ranging signal spreads the signal energy in time and frequency. A well-chosen modulation sequence enables to minimize the peak-to-average power ratio (PARP) of the transmitted signal while allowing other data to be sent over the carriers that are not used for ranging purposes. These capabilities may help to make the ranging process to be covert for an unauthorized observer.

In conventional OFDM communications, pilot tones, or pilot subcarriers, are modulated (e.g., BPSK, QPSK) according to known sequences and are inserted in a periodic fashion in the spectrum to assist, as training signal, in the synchronization and demodulation of the signal at the receiver. Advantageously, the present invention in one aspect thereof enables using these same pilot tones for ranging purposes. The ability to use only a subset of all available subcarriers for ranging is advantageous for reducing the overhead required for channel sounding and ranging. For example, in a point-to-multipoint orthogonal frequency division multiple access (OFDMA) wireless system, multiple user terminals can access the base station using different carrier sets while one terminal is carrying out channel sounding and ranging. The present invention may be used to greatly increase the accuracy of ranging between commercially available OFDM transceivers without making any significant hardware changes thereof. The relative amplitude and time of distinct echoes in a multipath channel relative to the sampling time at the receiver can readily be found with high precision. Furthermore, the fact that the ranging process can utilize the same means as the communication channel is a marked advantage for OFDM-based communication systems. The addition of the high-accuracy ranging capability to wireless devices should enable high-accuracy geo-locationing allowing for better utilization of the RF spectrum. Furthermore, conventional ranging signals such as a short radar impulse and a chirped signal can be emulated by specific input sequence modulating the OFDM carriers.

While illustrative embodiments of the invention have been described above, it is, of course, understood that various modifications of these embodiments are possible and will be apparent to those of ordinary skill in the art. Such modifications are within the spirit and scope of the invention, which is limited and defined only by the appended claims. For example, the methods and approaches described hereinabove may be applied not only to electromagnetic signals such as RF signals and optical signals, but also to acoustic signals or any other wave propagation process. It should also be understood that each of the preceding embodiments of the present invention may utilize a portion of another embodiment. An ordinary person in the art would be able to construct such embodiments without undue experimentation in light of the present disclosure.

Of course, numerous other embodiments are possible and will be evident by those skilled in the art having the benefit of the present description.

We claim:

1. A method for determining a receiver timing offset, comprising:
   a) receiving a coherent multicarrier (CM) signal by a receiver, the CM signal comprising a plurality of frequency multiplexed subcarriers characterized by subcarrier phases and subcarrier amplitudes and generated by a CM transmitter using a known subcarrier modulation pattern or a known absence of subcarrier modulation, wherein the receiver comprises circuitry for downconverting and sampling the CM signal and for performing frequency and time synchronization thereof to a local sampling clock;
   b) transforming the CM signal by the receiver into a sampled signal preserving relative subcarrier phase information, wherein the sampled signal has a sample rate R satisfying a Nyquist criterion R>2F, wherein F is a modulation bandwidth of the CM signal; and,
   using one or more digital processors to perform digital processing of the sampled signal to determine the receiver timing offset with a time resolution better than a sample period 1/R of the sampled signal, said digital processing comprising:
   c) computing a discrete complex channel impulse response (CCIR) from the sampled signal;
   d) processing the discrete CCIR to obtain a high-resolution channel function defined on a high-resolution time grid spaced by a time step dt that is at least 2 times smaller than the sample time period of the sampled signal;
   e) identifying a peak location in the high-resolution channel function; and,
   f) determining the receiver timing offset in the receiver from the peak location.

2. The method according to claim 1, wherein step d) comprises correlating the discrete CCIR with a high-resolution model function defined on the high-resolution time grid, wherein the high-resolution model function represents a pre-determined model CCIR and is stored in a computer-readable memory associated with the one or more digital processors.

3. The method of claim 2, wherein the high-resolution model function is obtained by combining a set of discrete time-shifted CCIR functions of a model communication channel.

4. The method according to claim 1, further comprising:
   obtaining the sampled signal in the form of two quadrature sequences of signal samples or a sequence of real-valued signal samples;
   transforming the sampled signal to a frequency domain to obtain subcarrier coefficients comprising amplitude and phase information for the plurality of subcarriers;
   obtaining the discrete CCIR from the subcarrier coefficients for the plurality of subcarriers using the known subcarrier modulation pattern.

5. The method according to claim 1, wherein the CM signal comprises a signal generated using orthogonal frequency division multiplexing (OFDM).

6. The method according to claim 5, wherein the receiver comprises an OFDM receiver.

7. The method of claim 1, wherein step e) comprises selecting a peak from a plurality of peaks in the high-resolution channel function.

8. The method of claim 7, wherein the selected peak is a first peak that satisfies a pre-determined condition.

9. The method of claim 1, wherein step b) is performed so as to preserve relative subcarrier amplitude information.

10. A method for determining a distance to an object from a first communication device comprising a first coherent multicarrier (CM) transmitter and a first receiver, comprising:
    the first CM transmitter transmitting a first ranging CM signal for impinging upon an object;
    recording in computer-readable memory a first transmission start time indicative of a time instance when the first ranging CM signal leaves the first CM transmitter;
    upon receiving by the first receiver a return CM signal from the object, performing the steps of:
    applying the method of claim 1 to the return CM signal to determine therefrom a first receiver timing offset in the first receiver;
    recording in the computer-readable memory a first coarse time of arrival for the return CM signal at the first receiver; and,
    using a digital processor to determine the distance between the object and the first communication device based on at least the first transmission start time, the first coarse time of arrival, and the first receiver timing offset.

11. The method according to claim 10, wherein the return CM signal comprises the first ranging CM signal reflected from the object.

12. The method according to claim 10, wherein the first ranging CM signal is an OFDM signal comprising a plurality of OFDM subcarriers modulated with a pseudo-random subcarrier modulation pattern.

13. The method according to claim 10, wherein the object comprises a second communication device comprising a second receiver and a second CM transmitter, the method further comprising:
    recording in computer-readable memory a second coarse time of arrival of the first ranging signal at the second communication device;
    generating the return CM signal by the second communication device using a subcarrier modulation pattern that is known to the first receiver;
    transmitting the return CM signal by the second CM transmitter for receiving at the first communication device; and,
    recording in computer-readable memory a second transmission start time at which the return signal leaves the second transmitter.

14. The method according to claim 13, comprising:
    applying the method of claim 1 to the first ranging CM signal received at the second receiver to determine a second timing offset at the second receiver;
    determining, by the digital processor, a time-of-flight value for CM signal propagation between the first and second communication device accounting for at least the first receiver timing offset and the second receiver timing offset.

15. The method according to claim 13, wherein the ranging signal is an OFDM signal comprising a plurality of OFDM subcarriers modulated with a pseudo-random subcarrier modulation pattern.

16. A method of ranging between two wireless transceivers, each wireless transceiver comprising a coherent multicarrier (CM) transmitter and a receiver, comprising:
the wireless transceivers exchanging ranging CM signals, while recording, by each of the wireless transceivers, a transmission start time for the ranging CM signal generated by the wireless transceiver, and a sampling start time for the ranging CM signal received by the transceiver;
applying the method of claim 1 to the ranging CM signals received by each of the two transceivers to determine receiver timing offset values therefor; and,
determining, with a digital processor, a time-of-flight value for CM signal propagation between the two transceivers based on the transmission start times, the sampling start times, and the receiver timing offset values.

17. In a system comprising a first wireless transceiver comprising a first CM transmitter and a first receiver at a first known location, a second wireless transceiver comprising a second CM transmitter and a second receiver at a second known location, a third wireless transceiver comprising a third CM transmitter and a third receiver, and a ranging server in communication with the first, second and third wireless transceivers, a method to determine a location of the third transceiver, comprising the ranging server performing:
directing the first transmitter to transmit a first ranging signal at a first reference time instant $Tref_1$ for reception by the second and third transceivers, and directing the second and third transmitters to transmit second and third ranging signals, respectively, for reception at the first transceiver, and using the first, second and third CM ranging signals for ranging according to the method of claim 16 between the first transceiver and the second transceiver, and between the first transceiver and the third transceiver, for determining:
a first time-of-flight value $ToF_{12}$ between the first transceiver and the second transceiver and a second timing offset $\delta t_2$ for the first ranging signal received at the second receiver;
a second time-of-flight value $ToF_{13}$ between the first transceiver and the third transceiver and a third timing offset $\delta t_3$ for the first ranging signal received at the third receiver;
determining a second reference time instant $Tref_2$ at the second transceiver relative to the first reference time instant $Tref_1$ at the first transceiver according to an equation $Tref_2 = Tref_1 + ToF_{12} - \delta t_2$;
determining a third reference time instant $Tref_3$ at the third transceiver relative to the first reference time instant $Tref_1$ at the first transceiver according to an equation $Tref_3 = Tref_1 + ToF_{13} - \delta t_3$;
directing the second transceiver to transmit a forth ranging CM signal at a first time delay $Tdelay_2$ after the second reference time instance $Tref_2$;
directing the third transceiver to receive the forth ranging CM signal at a second time delay $Tdelay_3$ after the third reference time instance $Tref_3$;
determining a forth receiver timing offset $\delta t_4$ for the forth ranging signal received at the third receiver;
computing a third time-of-flight value $ToF_{23}$ between the second transceiver and the third transceiver according to an equation $$ToF_{23} = ToF_{13} - ToF_{12} - \delta t_3 + \delta t_2 + Tdelay_3 - Tdelay_2 + \delta t_4;$$
and, determining the location of the third transceiver based on the time of flight values $ToF_{13}$, $ToF_{12}$, $ToF_{23}$, and the known location of the first and second transceivers by triangulation.

18. A method according to claim 17, wherein the system further comprises a fourth wireless transceiver comprising a fourth CM transmitter and a fourth receiver at a third known location, and wherein the first, second and third known locations include altitude information, the method further comprising the ranging server performing:
directing the fourth transmitter to transmit a fifth ranging signal for reception at the first transceiver, and using the fifth ranging signal and the first ranging signal received at the fourth transceiver for ranging according to the method of claim 16 between the first transceiver and the fourth transceiver, including:
determining a fourth time-of-flight value $ToF_{14}$ between the first transceiver and the fourth transceiver and a fifth timing offset $\delta t_5$ for the first ranging signal received at the fourth receiver;
determining a fourth reference time instant $Tref_4$ at the fourth transceiver relative to the first reference time instant $Tref_1$ at the first transceiver according to an equation $Tref_4 = Tref_1 + ToF_{14} - \delta t_5$;
directing the fourth transceiver to receive the fourth ranging CM signal at a third time delay $Tdelay_4$ after the fourth reference time instance $Tref_4$;
determining a sixth receiver timing offset $\delta t_6$ for the fifth ranging signal received at the fourth receiver;
computing a fourth time-of-flight value $ToF_{24}$ between the second transceiver and the fourth transceiver according to an equation $$ToF_{24} = ToF_{14} - ToF_{12} - \delta t_5 + \delta t_2 + Tdelay_4 - Tdelay_2 + \delta t_6;$$
and, determining three spatial coordinates of the third transceiver based on the time of flight values $ToF_{12}$, $ToF_{13}$, $ToF_{14}$, $ToF_{23}$, $ToF_{24}$ and the known locations of the first, second and fourth transceivers using a triangulation method.

19. A communication device, comprising:
receiver front-end circuitry configured to transforming a received signal into a sampled signal having a sample rate R satisfying a Nyquist criterion R>2F, wherein F is a modulation bandwidth of the signal;
a channel estimator configured to generating a discrete complex channel impulse response (CCIR) function from the sampled signal when the received signal comprises a plurality of coherently multiplexed subcarriers, wherein the channel estimator uses a known subcarrier modulation pattern, or a known absence of the subcarrier modulation for generating the CCIR function;
a correlator configured to correlating the discrete CCIR with a higher-resolution model function defined on a high-resolution time grid spaced at a time interval that is at least two times smaller than a sample time period of the sampled signal, and for outputting a high-resolution channel function defined on the high-resolution time grid; and
a peak processor configured to identifying a peak location in the high-resolution channel function for determining a timing offset in the receiver with a time resolution of a fraction of the sample time period.

20. The communication devices of claim 19, further comprising a model function memory storing the higher-resolution model function.

* * * * *